(12) United States Patent
Bazakos et al.

(10) Patent No.: US 7,602,942 B2
(45) Date of Patent: Oct. 13, 2009

(54) INFRARED AND VISIBLE FUSION FACE RECOGNITION SYSTEM

(75) Inventors: Michael E. Bazakos, Bloomington, MN (US); Vassilios Morellas, Plymouth, MN (US); Yunqian Ma, Roseville, MN (US)

(73) Assignee: Honeywell International Inc., Morristown, NJ (US)

( * ) Notice: Subject to any disclaimer, the term of this patent is extended or adjusted under 35 U.S.C. 154(b) by 834 days.

(21) Appl. No.: 10/987,806

(22) Filed: Nov. 12, 2004

(65) Prior Publication Data

US 2006/0102843 A1    May 18, 2006

(51) Int. Cl.
G06K 9/00    (2006.01)

(52) U.S. Cl. ............................. 382/103; 382/115; 702/3; 209/577

(58) Field of Classification Search ................. 382/103, 382/115, 117; 702/3; 209/577
See application file for complete search history.

(56) References Cited

U.S. PATENT DOCUMENTS

| | | | |
|---|---|---|---|
| 5,396,284 | A | 3/1995 | Freeman |
| 6,049,281 | A | 4/2000 | Osterweil |
| 6,215,519 | B1 | 4/2001 | Nayar et al. |
| 6,370,260 | B1 | 4/2002 | Pavlidis et al. |
| 6,437,819 | B1 | 8/2002 | Loveland |
| 6,445,298 | B1 | 9/2002 | Shepher |
| 6,483,935 | B1 | 11/2002 | Rostami et al. |
| 6,499,025 | B1 | 12/2002 | Horvitz et al. |
| 6,504,482 | B1 | 1/2003 | Mori et al. |
| 6,611,206 | B2 | 8/2003 | Milanski et al. |
| 6,678,413 | B1 | 1/2004 | Liang et al. |
| 6,718,049 | B2 | 4/2004 | Pavlidis et al. |
| 7,035,456 | B2 * | 4/2006 | Lestideau .................... 382/164 |
| 2002/0063711 | A1 | 5/2002 | Park et al. |
| 2002/0075258 | A1 | 6/2002 | Park et al. |
| 2002/0076087 | A1 | 6/2002 | You et al. |
| 2002/0105578 | A1 | 8/2002 | Hunter |
| 2002/0140822 | A1 | 10/2002 | Kahn et al. |
| 2002/0180759 | A1 | 12/2002 | Park et al. |

(Continued)

OTHER PUBLICATIONS

Author: Souheil Ben-Yacoub; "Multi-Modal Data Fusion for Person Authentication Using SVM"; IDIAP-Research Report 98-07, pp. 1-9.*

(Continued)

*Primary Examiner*—Vikkram Bali
*Assistant Examiner*—Eueng-Nan Yeh
(74) *Attorney, Agent, or Firm*—Kris T. Fredrick

(57) ABSTRACT

A face detection and recognition system having several arrays imaging a scene in the infrared and visible spectrums. The system may use weighted subtracting and thresholding to distinguish human skin in a sensed image. A feature selector may locate a face in the image. The image may be cropped with a frame or border incorporating essentially only the face. The border may be superimposed on images from an infrared imaging array and the visible imaging array. Sub-images containing the face may be extracted from within the border on the infrared and visible images, respectively, and compared with a database of face information to attain recognition of the face. Confidence levels of recognition for infrared and visible imaged faces may be established. A resultant confidence level of recognition may be determined from these confidence levels. Infrared lighting may be used as needed to illuminate the scene.

45 Claims, 30 Drawing Sheets

U.S. PATENT DOCUMENTS

| | | |
|---|---|---|
| 2003/0040815 A1 | 2/2003 | Pavlidis |
| 2003/0053658 A1 | 3/2003 | Pavlidis |
| 2003/0053659 A1 | 3/2003 | Pavlidis |
| 2003/0053664 A1 | 3/2003 | Pavlidis et al. |
| 2003/0076417 A1 | 4/2003 | Thomas et al. |
| 2003/0095186 A1 | 5/2003 | Aman et al. |
| 2003/0123703 A1 | 7/2003 | Pavlidis |
| 2003/0209893 A1 | 11/2003 | Breed et al. |
| 2004/0030531 A1 | 2/2004 | Miller |
| 2004/0240711 A1 | 12/2004 | Hamza et al. |
| 2005/0055582 A1 | 3/2005 | Bazakos et al. |
| 2005/0110610 A1 | 5/2005 | Bazakos et al. |

OTHER PUBLICATIONS

"Burt Adelson Pyramid," 3 pages, on or before Mar. 4, 2005.

"CBVBS '01 Final Program" 2 pages, 2001, (published before this application Nov. 12, 2004).

Albiol et al., "Robust Motion Detection for Video Surveillance Applications," IEEE, International Conference on Image Processing, 5 pages, Sep. 2003.

Burt, et al., "The Laplacian Pyramid as a Compact Image Code," IEEE Transactions on Communications, vol. COM-31, No. 4, pp. 532-540, Apr. 1983.

Caspi, et al., "Alignment of Non-Overlapping Sequences," 8 pages, prior to Oct. 20, 2005.

Chen et al., "Comparison and Combination of Visible and IR Image Face Recognition," 18 pages, prior to Oct. 20, 2005.

Cockshott, et al., "Microscopic Volumetric Image Data Compression Using Vector Quantization and 3D Pyramid," 5 pages, prior to Oct. 20, 2005.

Gibbons et al., "IrisNet: An Architecture for Internet-Scale Sensing," pp. 1-10, prior to Oct. 20, 2005.

http://www.merl.com/projects/MultiCamera/, "Multi-Camera Systems," 2 pages, printed Jan. 19, 2004.

Javed, et al., "Knight$^M$: A Real Time Surveillance System for Multiple Overlapping and Non-Overlapping Cameras," 4 pages, prior to Oct. 20, 2005.

Javed, et al., "Tracking Across Multiple Cameras with Disjoint Views," Proceedings of the Ninth IEEE International Conference on Computer Vision, 6 pages, Oct. 13-16, 2003.

Kettnaker, et al., "Bayesian Multi-Camera Surveillance," IEEE, vol. 2 pp. 253-259, Jun. 1999.

Khan, et al., "Consistent Labeling of Tracked Objects in Multiple Cameras with Overlapping Fields of View," 27 pages, Apr. 25, 2002.

Khan, et al., "Human Tracking in Multiple Cameras," 6 pages, prior to Oct. 20, 2005.

Khan, et al., "Tracking in Uncalibrated Cameras with Overlapping Field of View," 8 pages, prior to Oct. 20, 2005.

Kogut, et al., "A Wide Area Tracking System for Vision Sensor Networks," 9th World Congress on Intelligent Transport Systems, 11 pages, Oct. 2002.

Nath et al., "IrisNet: An Architecture for Enabling Sensor -Enriched Internet Service," pp. 1-15, Dec. 2002.

Pavlidis et al., "Urban Surveillance Systems: From the Laboratory to the Commercial World," pp. 1-18, prior to Oct. 20, 2005.

Pavlidis et al., "Automatic Passenger Counting in the High Occupany Vehicle (HOV) Lanes," 19 pages, prior to Oct. 20, 2005.

Porikli, et al., "Multi-Camera Calibration, Object Tracking and Query Generation," Mitsubishi Electric Research Labs, 4 pages, prior to Oct. 20, 2005.

Quian et al., "Structure From Motion Using Sequential Monte Carlo Methods," Kluwer Academic Publishers, pp. 1-54, Jan. 15, 2004.

http://esdl.computer.org/comp/proceedings/fg/1996/7713/00/77131082abs.htm, "Comparison of visible and infra-red imagery for face recognition," 1 page, printed Jan. 20, 2004.

http://www.cc.gatech.edu/classes/AY200/cs7495_fall/participants/iwc/paperpres/Visible . . . "Comparison of Visible and Infra-Red Imagery for Face Recognition," 3 pages, printed Jan. 20, 2004.

Cutler, "Face Recoginition Using Infrared Images and Eigenfaces," pp. 1-5, Apr. 26, 1996.

Dowdall et al., "A Face Detetion Method Based on Multi-Band Feature Extraction in the Near-IR Spectrum," 9 pages, prior to filing date of the present application, (published before this application Nov. 12, 2004).

Dowdall et al., "Face Detection in the Near-IR Spectrum," 15 pages, prior to filing date of present application, (published before this application Nov. 12, 2004).

Fromherz et al., "A Survey of Face Recognition," pp. 1-18, prior to filing date of present application, (published before this application Nov. 12, 2004).

Morimoto et al., "Pupil Detection and Tracking Using Multiple Light Sources," Image and Vision Computing, 18, pp. 331-335, 2000, vol. 18, issue 4; Mar. 1, 2000.

Pavlidis et al., "A Near-Infrared Fusion Scheme for Automatic Detection of Vehicle Passengers," pp. 1-8, prior to filing date of present application, (published before this application Nov. 12, 2004).

Selinger et al., "Appearance-Based Facial Recognition Using Visible and Thermal Imagery: A Comparative Study," 28 pages, prior to filing date of present application, (published before this application Nov. 12, 2004).

Socolinsky et al., "Illumination Invariant Face Recognition Using Thermal Infrared Imagery," 8 pages, prior to filing date of present application, (published before this application Nov. 12, 2004).

Xu et al., "Pedestrian Detection and Tracking with Night Vision," 10 pages, prior to filing date of present application, (published before this application Nov. 12, 2004).

\* cited by examiner

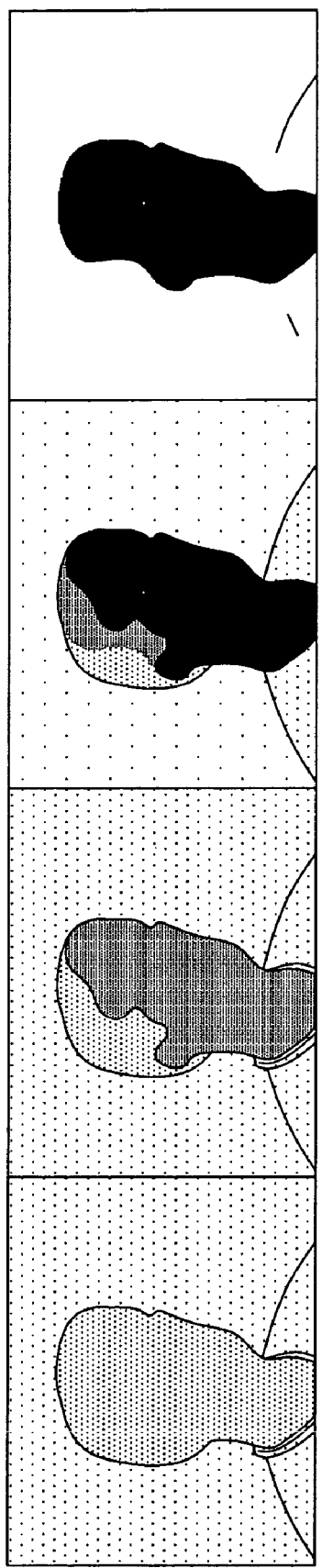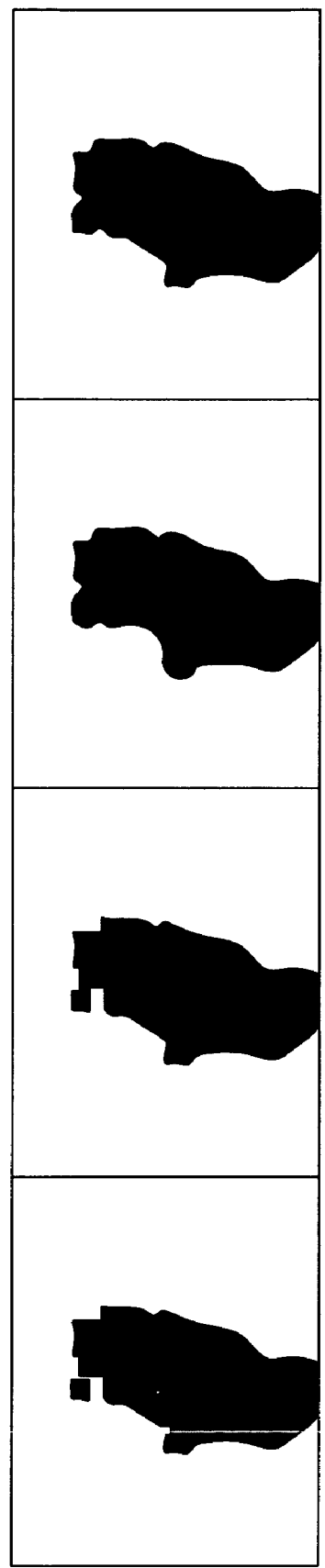
Figure 23A Figure 23B Figure 23C Figure 23D
Figure 23E Figure 23F Figure 23G Figure 23H

INFRARED AND VISIBLE FUSION FACE RECOGNITION SYSTEM

BACKGROUND

The present invention pertains to detection of people and particularly to recognition of people. More particularly, the invention pertains to detection and recognition of people under various lighting conditions.

The invention may be related to a patent application entitled "Infrared Face Detection and Recognition System", having application Ser. No. 10/987,368 and filed approximately concurrently with the present application.

There are many commercial off the shelf (COTS) face recognition systems (FRS) available for use. All of these systems may require strict face positioning in front of a camera and good illumination. Such conditions are often not available where face recognition may be needed or desired. In many practical situations, the subject being sought for detection and recognition may be moving while passing in front of a camera used for such tasks. Further, the illumination of the subject may be inadequate or inconsistent, or there may be total darkness. Also, there may low or insufficient confidence levels during a matching process of the detected face and a known face in a database.

Art that may be relevant includes U.S. Pat. No. 6,370,260 B1, issued Apr. 9, 2002, entitled "Near-IR Human Detector", and by Pavlidis et al.; U.S. Pat. No. 6,718,049 B2, issued Apr. 6, 2004, entitled "Near-Infrared Disguise Detection", and by Pavlidis et al.; and U.S. patent application Ser. No. 10/077,672, filed Feb. 15, 2002, entitled "Near-Infrared Method and System for Use in Face Detection", and by Pavlidis et al.; all of which are incorporated herein by reference. The assignee of these patent documents is the same assignee of the present invention.

SUMMARY

The invention may utilize two bands of infrared light and a band of visible light for detection and recognition of people's faces. The system may use a camera having multi-band detection capabilities. As the environment in which one wants to do recognition becomes darker, invisible lighting may be used for detection and recognition, even in complete darkness. Also, there may be facial feature identification for framing a detected face for recognition. There may be a combining of infrared and visible recognitions for a significant overall confidence level of recognition.

BRIEF DESCRIPTION OF THE DRAWINGS

FIGS. 23a-23h are illustrations describing a system for defining the facial search area as shown generally in FIG. 20, and more specifically in FIG. 22;

DESCRIPTION

Figure 1A:
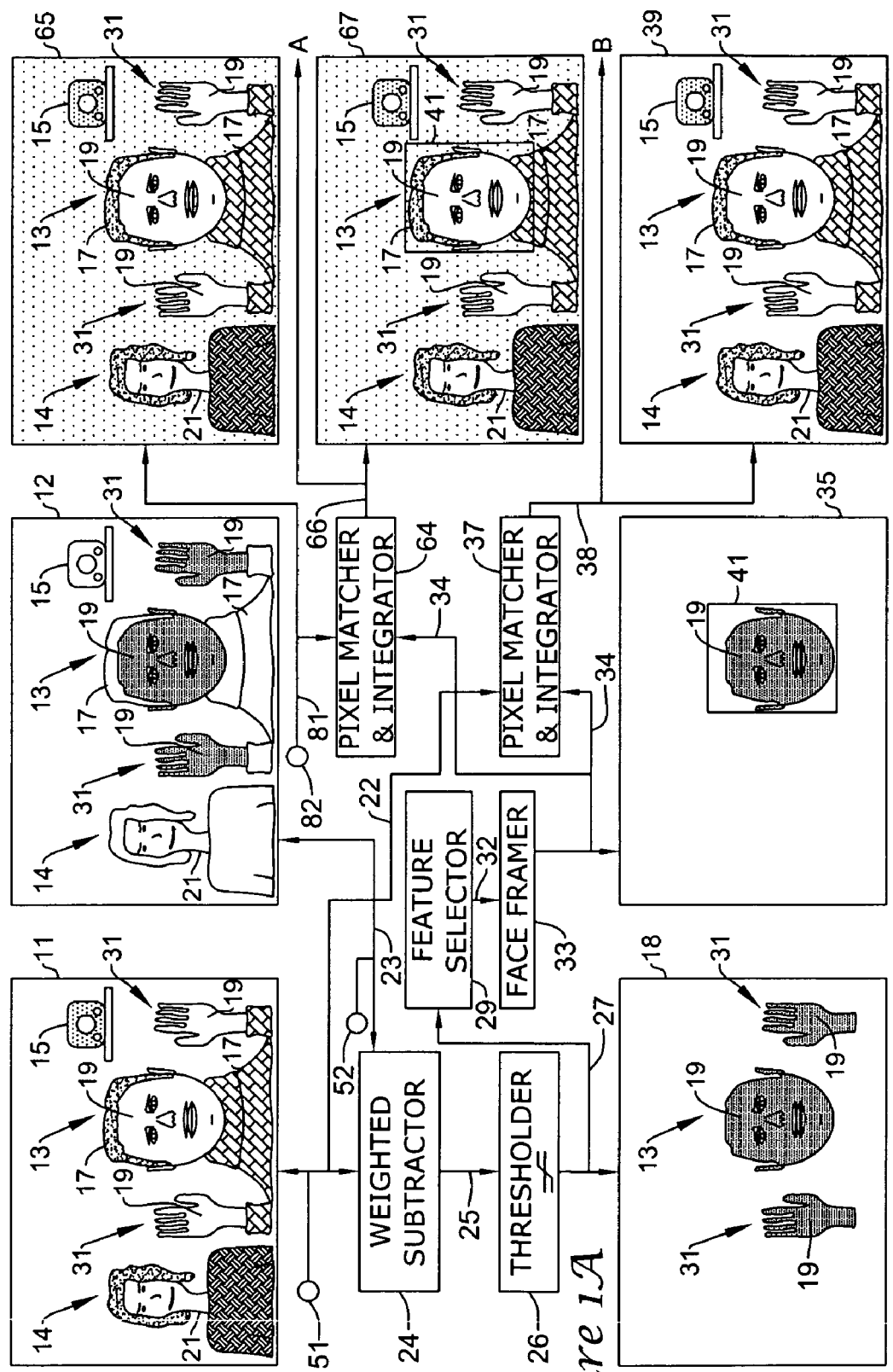
FIGS. 1a and 1b reveal a three-band detection, fusion, recognition, and confidence level indication system.

Most face recognition systems may operate in the visible spectrum (i.e., 250-700 nanometers) and thus require adequate and stable illumination on the face. Some IR-based systems may operate very close to the visible spectrum (i.e., near IR—800-900 nanometers). This appears to be too narrow of a band and also too close and similar to the visible spectrum, but a weak representation of the visible spectrum. Thus, this band does not necessarily add much more information than the visible band does about the face.

The present invention may utilize the entire visible band (i.e., 250-700 nanometers), and the entire lower reflective infrared (LRIR) band (i.e., approximately 800-1400 nanometers). There may be a significant amount of reflected energy well above 800 nanometers all of the way up to 1400 nanometers. This approach may gather much more energy and information about the face over a very broad band (i.e., visible and IR). The LRIR may be detected with a multi-band imaging (MBI) camera sensitive to that band for the enrollment, testing and matching of the detected face for recognition. The other band of interest may be the upper reflective infrared (URIR) band (i.e., approximately 1400-2200 nanometers). A LRIR sensed image may provide an image that resembles a black and white picture.

A URIR sensed image may provide an image that may distinctively show human skin/flesh with a contrast to other materials. The URIR sensed image is not like the LRIR sensed image in that the flesh-like matter does not reflect the IR in the same manner as the other matter, e.g., inanimate objects. Since the lower and upper IR bands are reflective, the scene may need a source of illumination. However, such illumination need not be visible and so will not be a distraction to or seen by a human being, and it may be safe to the human eyes. There may be scene detection in pure darkness. In the daytime, the LRIR and URIR illumination may be unnecessary because sufficient illumination may be provided by ordinary daylight.

In addition to IR, the visible band may be utilized for detection and recognition of human beings. The present system may operate in the IR mode only, the visible mode only, or both the IR and visible modes. The system may automatically assess the level of ambient illumination and switch for the visible mode to the IR mode. Or the system may use both modes with appropriate weights and combine the results (i.e., fusion) to improve the match confidence levels of the detected face with a face in a database. Enrollment may be performed by capturing a face of a person using both the visible and the lower IR of the MBI camera, or a camera with two channels, one visible and one IR operating in the lower IR band and coupled with an IR illumination source. Testing for the match may be performed by using the two channel (visible and low IR band) camera coupled with the IR source or the MBI camera. Since the gain of the output energy of the IR source may automatically adjusted by a computer, and possibility associated software; enrollment and testing for a match and face recognition may be performed under all illumination conditions, including complete darkness.

The invention may work with any COTS FRS. The camera may have an integrated IR light source which is invisible to the human eye. The energy level of the source may be computer controlled in view of the image and ambient lighting conditions. Under good illumination conditions, the IR illumination source does not have to output energy. The less ambient illumination there is, the light source may output more IR light so that a constant image intensity is maintained at the lower reflective IR band. Since one may be able to obtain a stable face image (picture) in the LRIR band, under various ambient illumination conditions, and that this IR picture contains virtually all of the structural information of the face, then the usual video image of the face, which is input to the FRS, may be replaced by the LRIR image of the face.

There may be a utilization of a procedure of enrollment and testing for a match required by any FRS. Enrollment may be performed by capturing the face of the person using the LRIR of the MBI camera, or a single band IR camera operating in the LRIR wavelength band coupled with the above-mentioned IR source. Also, enrollment may be performed by capturing the face with the visible band of MBI or other camera. Testing for the match may be performed by using the same IR band camera coupled with the IR source. Since the gain of the output energy of the IR source may be automatically adjusted by a computer and appropriate software, the enrollment and testing for the match and face recognition may be performed under all illumination conditions, including complete darkness of the visible spectrum.

In FIG. 1a, shows an image 11 that is sensed in the LRIR band. The picture may resemble a normal photograph having the black and white characteristics with a gray scale presentation. FIG. 1a further shows an image 12 that is sensed with the URIR band. As may be noted, a flesh 19 part of the person in the image has a significant contrast relative to the other items in the image 12. The reflectance of the flesh may be only a fraction of the reflectance of the other items, such as the inanimate objects, between 1400 and 2200 nanometers, i.e., the URIR band. This contrast may be seen in image 12 where the flesh 19 of the man 13 appears dark. Everything else in image 12 appears to be light in that each of the reflectance properties appears to be high in the URIR band. In the LRIR band the reflectance properties appear to be normal relative to their color or visual contrast. One may note that a woman 14 in image 11 appears to be rather normal in terms of reflectivity relative to image 11. However, in image 12 she does not exhibit the expected reflectivity of an apparent flesh 21 as the man 13 does. The reason is that she is a mannequin. The other inanimate things such as the radio 15, clothes 16 and hair 17 (including the eyebrows and mustache) may exhibit similar reflectances in images 11 and 12 as the mannequin.

The two images 11 and 12 may have the same field-of-view and be identical to each other on a pixel-to-pixel basis. This basis may make it possible to compare each of the pixels and do a weighted subtraction in terms of brightness, intensity, or contrast of each corresponding pixel pair in the images 11 and 12. The pixel pair signals 22 and 23 from images 11 and 12, respectively, may go to a weighted subtractor 24 for the subtractions. Then the results 25 of the subtractions of the pixel pairs (or pixel trios with the visible) may be thresholded by a thresholder 26 to isolate the pixels of the low reflectance areas, such as the skin or flesh 19, in the URIR band. The remaining pixels may be nullified. The thresholding results 27 from thresholder 26 may be shown by an image 18 which appears to reveal only the skin or flesh 19 pixels of the man 13. The subtracting and thresholding may be accomplished with adder-, subtractor- and/or comparator-like circuitry. The image 18 pixel signals of the flesh 19 of the man 13 may go to a face feature selector and face identifier (selector/identifier) 29. Selector/identifier 29 may seek out the features (e.g., eyes, nose, mouth, ears, head shape, and/or the like) of the face of the man 13 with one or more face feature identification algorithms being applied to flesh pixels 19. The results of the one or more face feature identification algorithms may lead to an identification of the face of the man 13 according to the identified features. Since features of the flesh 19 pixels of hands 31 were not identified by the selector/identifier 29, these flesh 19 pixels may be eliminated thereby leaving only the flesh 19 pixels of the face remaining from the selector/identifier 29. Signal 32 identifying the flesh 19 pixels of the face of man 13 may go to a framer 33. Framer 33 may frame the face flesh 19 pixels with a border that is about 10 to 20 percent or so greater than the image made up by the selected out and identified face flesh 19 pixels of the signals 32. This border size may permit the inclusion of hair or hairdo of the person in the resulting portrait or framed face 41. The flesh 19 face pixels with the framing may go as signals 34 to be an image 35 of the framed face 41.

Figure 1B:
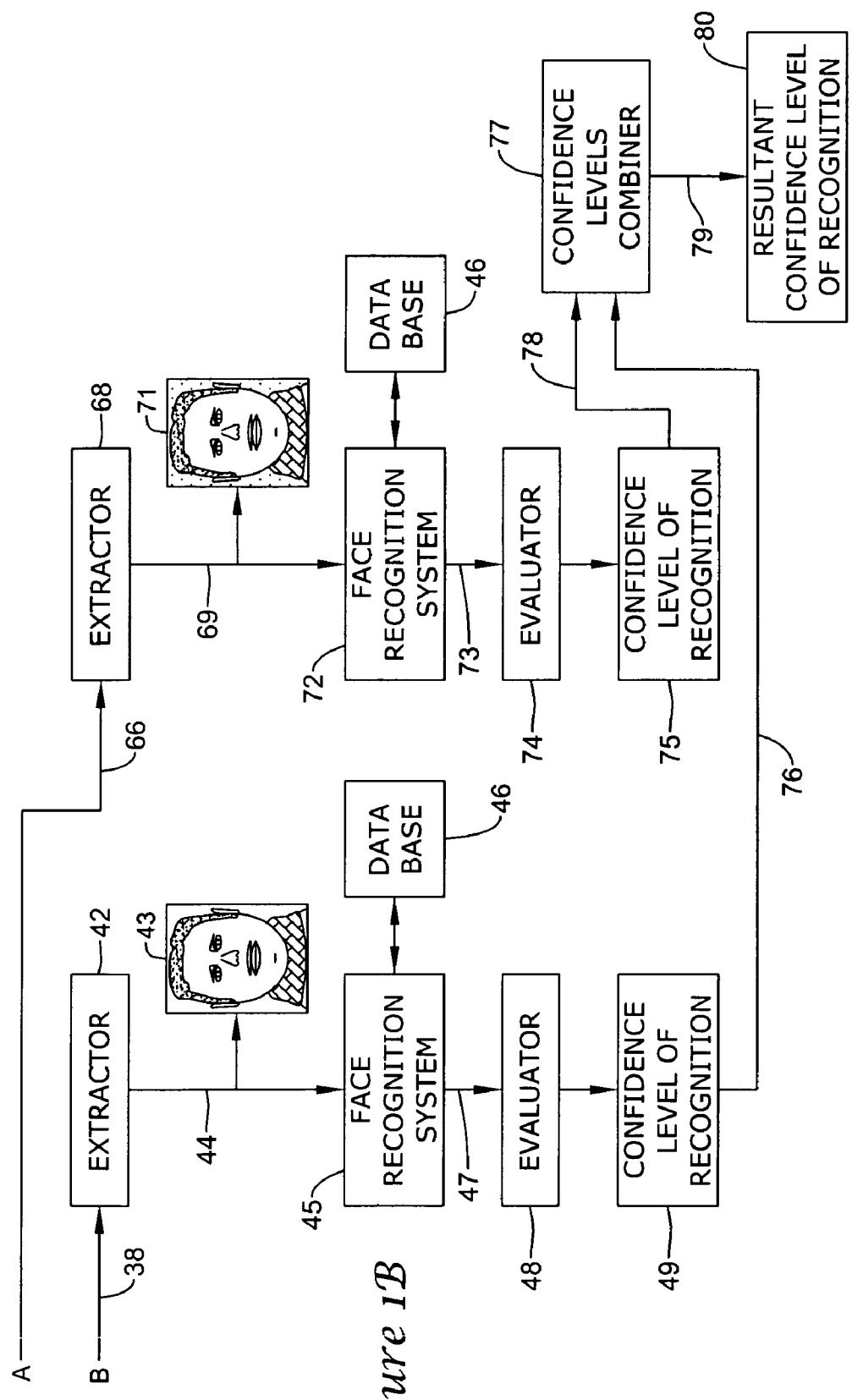

Framed face 41 signals 34 of image 35 may go to a pixel matcher and integrator 37 of images 11 and 35 which may superimpose the frame face on image 11 to result in signals 38. Resulting signals 38 from matcher and integrator 37 are shown by an image 39. Signals 38 may go to an extractor 42 via a connection B between FIGS. 1a and 1b. Extractor 42 may pull out pixels from image 11 that are within the framed face 41 to result in signals 44. Signals 44 may carry a framed face portrait 43 which appears like that of framed face 41 but instead has the pixels of LRIR image 11 rather than those of URIR image 12, and so it appears like a normal-like black and white portrait 43 of man 13. The signals 44 carrying the pixels of portrait 43 may go to a face recognition system 45. System 45 may be a commercial-off-the-shelf system (COTS) from a vendor such as Visionics of Minnetonka, Minn., Cognitech of Pasadena, Calif., or other provider of a face recognition system (FRS). The system 45 may be connected to a database 46 of, for example, portraits and/or pictures of various people such as those in a company security database or other related information that may be used for identifying employees entering a facility, a criminal database that may be used for identifying suspects, or in any other appropriate database that may be used for various applications.

Signals 47 may provide results of a comparison of portrait 43 with one or more portraits or pictures of person from the database 46. These signals 47 may go to an evaluator 48 which may evaluate the results of the comparison of portrait 43 and provide a confidence level 49 of recognition of the person in the portrait 43.

Framed face 41 signals 34 of image 35 may go to a pixel matcher and integrator 64 of images 65 and 35 which may superimpose the frame face on the visible image 65 to result in signals 66. Visible image 65 may be provided by signals 81 via an input 82 from a visible sensing array of a single or multi-band camera 50. Resulting signals 66 from matcher and integrator 64 are shown by an image 67. Signals 66 may go to an extractor 68 via a connection A between FIGS. 1a and 1b. Extractor 68 may pull out pixels from image 67 that are within the framed face 41 to result in signals 69. Signals 69 may carry a framed face portrait 71 which appears like that of framed face 41 but instead has the pixels of visible image 67 rather than those of URIR image 12, and so it appears like a normal-like visible band portrait 71 of the man 13. The signals 69 carrying the pixels of portrait 71 may go to a face recognition system 72. System 72 may be a commercial-off-the-shelf (COTS) FRS like that of system 45. The system 72 may be connected to a database 46 of, for example, portraits and/or pictures of various people such as those in a company security database or other related information that may be used for identifying employees entering a facility, a criminal database that may be used for identifying suspects, or in any other appropriate database that may be used for various applications.

Signals 73 may provide results of a comparison of portrait 71 with, for instance, one or more portraits or pictures of persons from the database 46. These signals 73 may go to an evaluator 74 which may evaluate the results of the comparison of portrait 71 and provide a confidence level 75 of recognition of the person in the portrait 71.

Signals 76 indicating the confidence level 49 of recognition of portrait 43 with information from the database 46 may go to a confidence levels integrator or combiner 77. Similarly, signals 78 indicating the confidence level 75 of recognition of portrait 71 with information from the database 46 may go to a confidence levels combiner 77. An output signal 79 from combiner 77 may indicate a resultant confidence level of recognition 80 of the confidence levels carried by signals 76 and 78. There may be a program designed to accommodate the various confidence levels of recognition and provide the resultant confidence level of the matches of portraits 43 and 71 with information with database or databases 46 or information or data from other sources or inputs to a computer 53 (FIG. 2) of the overall system 10. Databases 46 may be one and the same or different databases. The program may be heuristic and/or adaptable according to empirical data, past matches and their confirmed or disconfirmed results, and/or other data and information. The program and/or apparatus may be a COTS system. It may be noted that a combining of confidence levels is not a mere addition of levels. For instance, confidence levels of 25 percent and 30 percent do not necessarily add up to a confidence level of 55 percent. Two confidence levels of 70 percent would not add up to a confidence level greater that 100 percent. Thus, as many factors as practical may be incorporated in determining a resultant confidence level.

Figure 2:
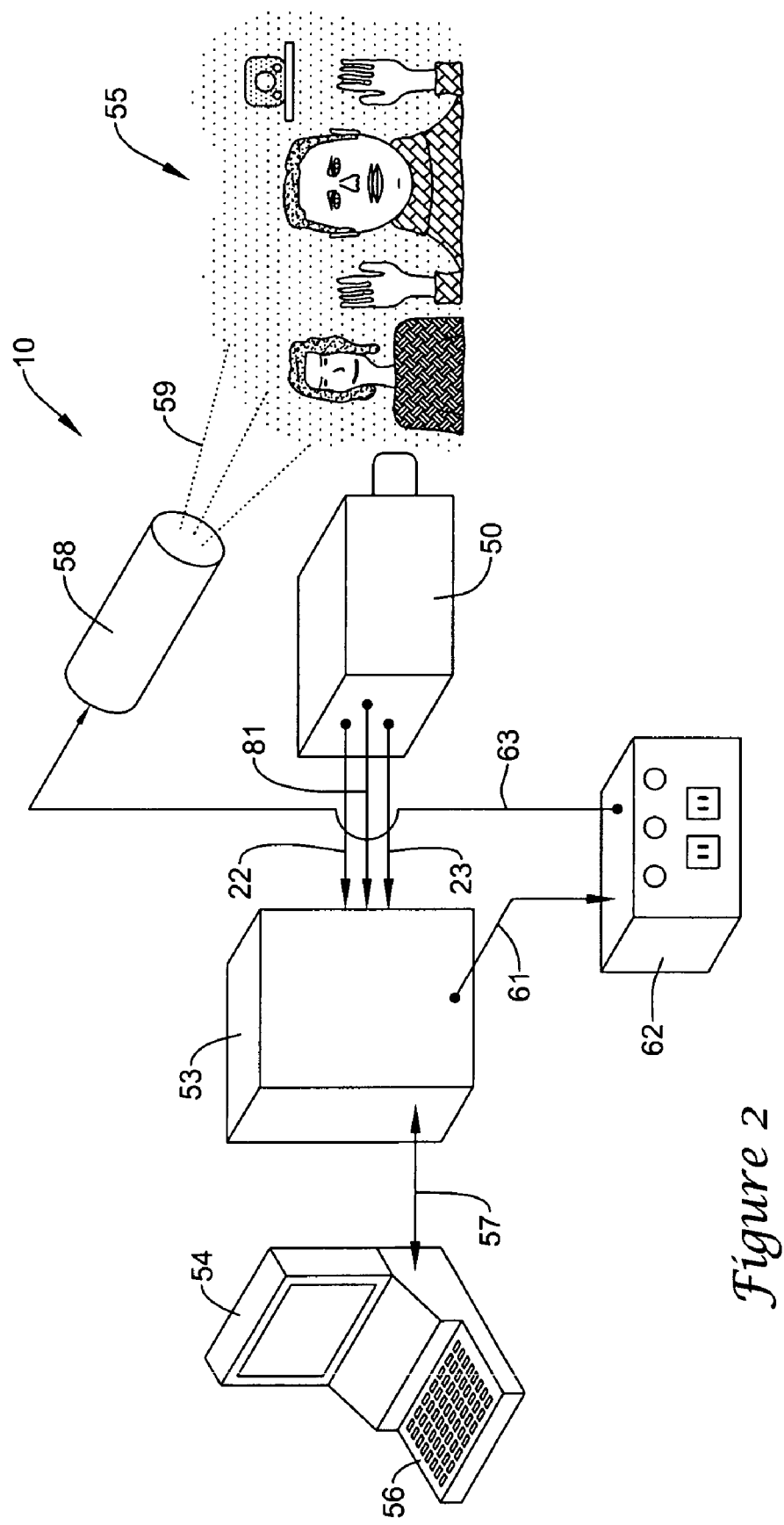
FIG. 2 is an illustrative example a layout for the system of FIGS. 1a and 1b.

From a camera 50 in FIG. 2, an input 51 may provide the signal 22, an input 52 may provide the signal 23, and an input 82 may provide the signal 81. Camera 50 may be focused on a scene 55. Camera 50 may be a several band camera which takes an image 11 in the LRIR band, an image 12 in the URIR band, and an image 65 in the visible band of the scene 55. Images 11, 12 and 65 may be sent as signals 22, 23 and 81, respectively, to a computer 53 of FIG. 2. The images may be processed by the computer according to the operational systems and/or sub-systems shown in FIG. 1. The images may be displayed to a user on a screen 54. A user may interface with the computer 53 via a keyboard 56. Screen 54 and keyboard 56 may be connected to computer 53 via a connection 57. Connection 57 and other connections of the overall system 10 may be hard wired, optical, wireless, or of another manner. Scene 55 may receive sufficient illumination from ordinary daylight. However, under poor light conditions or in total darkness, an illuminator 58 may be used which could emanate infrared light 59 covering the LRIR and URIR bands. The amount of light required may vary depending on other light such as daylight and the environment and conditions of the subject matter such as distance from the camera 50. The sensed images 11, 12 and 65 may provide an indication of the sufficiency the lighting of the scene 55 via signals 22, 23 and/or 81 to computer 53. In response to the sensed lighting conditions, the computer 53 may provide an appropriate intensity control signal 61 to a power supply 62 which may in turn output a certain electrical power via a connection 63 to the illuminator 58 so as to provide proper lighting 59 on the scene 55 under low or no visible lighting.

Various kinds of cameras 50 may be used. One may be a tri-band camera by Honeywell International Inc. of Morristown, N.J. This camera may be capable of separately providing images in the LRIR, URIR and visible bands. The camera may have three detector arrays of pixels positioned in the camera at certain angles relative to each other with one or more beam splitters between them and the lens of the camera facing the scene. The arrays may be co-registered with pixels detecting each portion of the scene 55 the same on a one-to-one pixel basis and in terms of timing for sending the pixel signals to a processor/computer 53. Still another camera 50 may involve several separate cameras, one for detecting LRIR, one for detecting URIR, and one for detecting visible light. The cameras may use filters or other mechanisms for distinguishing and independently detecting the scene in the reflective IR bands and the visible band. These mechanisms may be utilized for a single unit triple band camera. The detecting array may have several sets of pixels on the same array for detecting the scene in all of the bands. For example, the each pixel of the array may be a triple pixel or a set of co-pixels where one may have a filter for LRIR, a filter for URIR and no filter for visible light. There may be another manner for achieving separate three band detection with the pixels on the array. There may be multiplexing techniques that may be used for single camera, single array three-band detection.

In other words, system 10 may capture an image 11 of the scene 55 with a sensing array 111 (FIG. 3) sensitive to the lower reflective IR, an image 12 of the scene 55 with a sensing array 112 sensitive to the upper band of reflective IR, and an image 65 of the scene 55 with a sensing array 150 sensitive to a band of visible light. The images 11, 12 and 65 may have m×n pixels, and have the same field of view of the scene 55.

Each pixel $P_{(i,j)1}$ of the image 11 may be located at an $i_{th}$ row and a $j_{th}$ column. Each pixel $P_{(i,j)2}$ of the image 12 may be located at an $i_{th}$ row and a $j_{th}$ column. Each pixel $P_{(i,j)1}$ of the image 65 may be located at an $i_{th}$ row and a $j_{th}$ column. These pixel locations may be instances of the ranges where $1 \leq i \leq m$ and $1 \leq j \leq m$.

Each pixel $P_{(i,j)1}$ of the image 11 may have a counterpart pixel $P_{(i,j)2}$ in the image 12 in a one-to-one mapping of the image 11 to the image 12. Each pixel $P_{(i,j)1}$ of the image 12 may have a counterpart pixel $P_{(i,j)2}$ in the image 65 in a one-to-one mapping of the image 12 to the image 65.

A difference intensity pixel $\Delta I_{P(i,j)}$ may be determined from an intensity of each pixel $I_{P(i,j)1}$ of the image 11 and each counterpart pixel $I_{P(i,j)}$ of the image 12, for all of the pixels of the images 11 and 12. Each difference intensity pixel $\Delta I_{P(i,j)}$ may have an intensity value that is measured against an intensity threshold value and has its value nullified if it does not meet a certain range of intensity values relative to the intensity threshold value. Each of the ones that do meet it may become a thresholded difference intensity pixel $T\Delta I_{P(i,j)}$.

Each thresholded difference intensity pixel together with each other thresholded difference intensity pixel may form an image 18 having a one-to-one mapping of pixels to the images 11, 12 and 65. Features of a face may be sought, and if found, a face may be detected in the image 18 and a frame 41 scribed as frame pixels around the face as shown in image 35. Copying the frame 41 pixels from the image 35 to the image 11 and the image 65 may be done on a one-to-one mapping basis and result in images 39 and 67, respectively. The pixels within the frame 41 in the image 39 may extracted to form an image 43 having the face extracted from the image. The pixels within the frame 41 in the image 67 may form an image 71 having the face extracted from the image.

To review, radiation in the middle region of the electromagnetic (EM) spectrum may be regarded as the infrared spectrum. This spectrum includes wavelengths from 0.7 to 100 microns. Within the infrared range, several bands of particular interest may be the 0.7 to 3.0 micron, 3.0 to 5.0 micron and 8.0 to 14 micron bands. The latter two bands are regarded as the thermal infrared band and the first band as the reflected infrared band. The reflected infrared band may be associated with reflected solar radiation that contains no information about the thermal properties of materials. The thermal infrared band, on the other hand, is associated with the thermal properties of materials.

The thermal infrared band may be significant for several reasons. First, the human body maintains a relatively constant temperature of about 37 degrees Celsius (C.), irrespective of physical characteristics or illumination conditions. This indicates a consistent light color pattern for the faces of vehicle occupants subject to thermal infrared imaging. This consistency is lacking in the visible spectrum. Such consistency facilitates interpreting sensed images. Further, the thermal property may serve as a differentiator between humans and dummies. Also, a sensor functioning in the thermal region may be operational day and night without any need for an external illumination source.

However, one concern is the attenuation of thermal infrared radiation caused by glass, when detecting humans in a vehicle. The glass may severely disrupt the transmission of infrared radiation at wavelengths greater than 2.8 microns. At 2.8 microns, thermal energy may just begin to appear. To obtain an infrared image under such conditions, one may need a very sensitive mid-infrared camera in the range from 2.0 to 3.0 microns. However, detection with a reflective-infrared camera may significantly reduce this problem of radiation attenuation.

A reflective-infrared camera, if it is restricted to the appropriate range, may output similar imaging signals for various humans despite their having different colors of skin. However, this camera may output a much different imaging signal for a dummy having the same visible color as the human skin.

One system may have a multi-band camera or several cameras of different sensing wavelengths in the reflective-infrared bandwidth and the visible spectrum. This camera may be pointed toward a place where humans may be detected. An infrared lamp for the illumination of the scene may be used. The outputs of the several cameras or one camera providing the scene in the LRIR and URIR bands may be fused together with a weighted difference to result in an image having an intensified contrast. The image output of the device that performs the fusion of the two camera images may go to a post-processor, which performs binary thresholding on the various pixels of the fused image. The result may be an image with each pixel either being black or white. The thresholded output may undergo such operations utilizing such mechanisms such as fuzzy neural network or analytical processing. The thresholded output may diminish all of the background of the viewed scene except human skin, such as faces.

Figure 3:
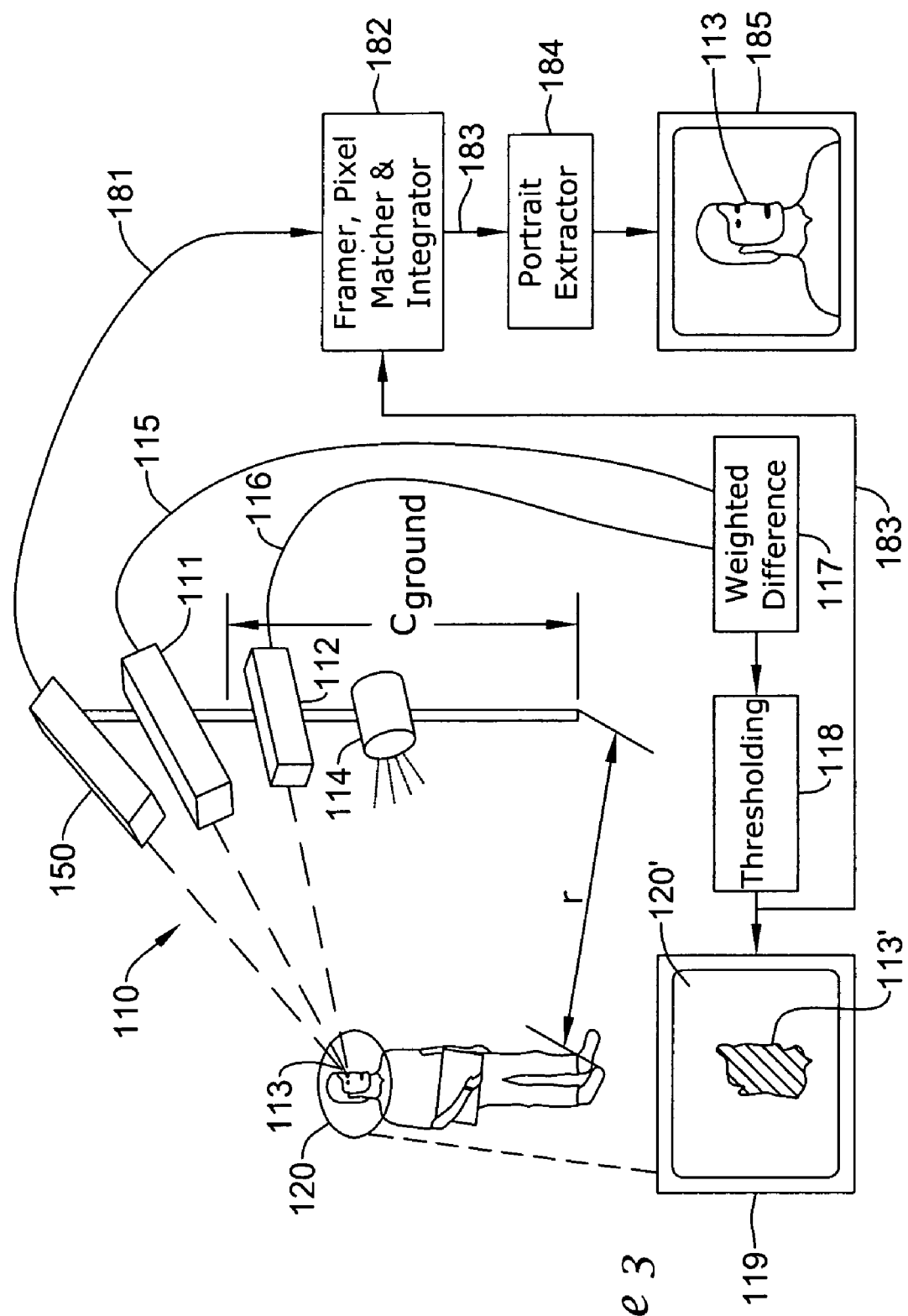
FIG. 3 shows a multi-band infrared fusion and visible system for detecting humans.

FIG. 3 shows a basic layout of a reflective-infrared, visible fusion system 110 for detecting humans. It may be a multi-band imaging system. Several co-registered cameras 111, 112 and 150 or one multi-band camera may sense the image of, for instance, a face 113 of a human being. Even though a multi-band camera may be use in place of cameras 111, 112 and 150, for an illustrative example, the discussion here may be in the context of the three cameras 111, 112 and 150. However, the description may be applicable to a single multi-band camera 50 of FIG. 2. Camera 111 may have a spectral sensitivity of 0.8 to 1.4 microns. Camera 112 may have a spectral sensitivity of 1.4 to 2.2 microns. Slightly shorter or longer ranges may also yield acceptable detection results. Camera 150 may have a visible spectral sensitivity. The 1.4-micron threshold point between the two bands of spectral sensitivity may be a demarcation point for the multi-band system 110, but may be another value as appropriate. Each of the IR camera sensitivity band ranges may cross somewhat the 1.4 micron wavelength without diminishing the human detecting ability of system 110. The quality of the imaging signals from cameras 111 and 112 may remain high even during overcast days and at nighttime, because of the scene being scanned by cameras 111 and 112, can be illuminated with an eye-safe infrared illuminator 114. Since the eye is not sensitive to the infrared spectrum, system 110 may remain stealthy all of the time, whether in a detection mode or not. The camera at the lower band range (0.8 to 1.4 microns, LRIR) may be an image intensifier. Therefore, the illuminator's spectral emission specification may only need to be in the area of the upper band range (1.4 to 2.2 microns, URIR). The URIR may be quite far from the visible spectrum and illumination in these wavelengths is safe even for highway applications. The infrared cameras 111 and 112 may provide clear imaging signals even in foul weather conditions such as hazy conditions. These particular infrared bands of detection and illumination may provide for sufficient light transmission through windshields, side windows, fog, and darkness. This may permit adequate detection of humans in vehicles at night and in poor weather.

The image outputs 115 and 116 of cameras 111 and 112, respectively, may go to a weighted difference software process 117 or specialized hardware that fuses the outputs by performing weighted subtraction of the intensities of the two camera images. This weighted difference software or hardware may be referred to as a fuser. Such fusion of the camera outputs may intensify the silhouette of face 113 and other exposed human skin in the resultant fused image. Also, the image may feature a diminution of the background of the scene being covered by the cameras. This increased contrast between the person and the background in the fused image may permit excellent image segmentation through thresholding by a software process 118, or specialized hardware. This thresholding software or hardware may be referred to as a thresholder. Outputs 183 of the thresholder 118 may go to a display 119, printer, or a post-processor, or to specialized hardware such as a framer, pixel matcher and integrator 182 that ties the outputs 183 in with the image outputs 181 from the visible band camera 150. The output of device 182 may be a framed image 113' that may go to a portrait extractor 184. Portrait extractor 184 may provide a portrait 185 of the detected human face 113 in the visible band.

A processed image may show the exposed skin parts, such as face 113, as binary blob 113', as shown in FIG. 3. Background 120 of sensed face 113 may be discounted as shown by blank background 120' in display 119. This clean-cut binary imagery may ensure reliable and fast operation of a pattern recognition algorithm that identifies a human as indicated by face 113' imagery. This binary image may be matched with the pixels of the visible image output 181 of camera 150 in device 182.

Figure 4:
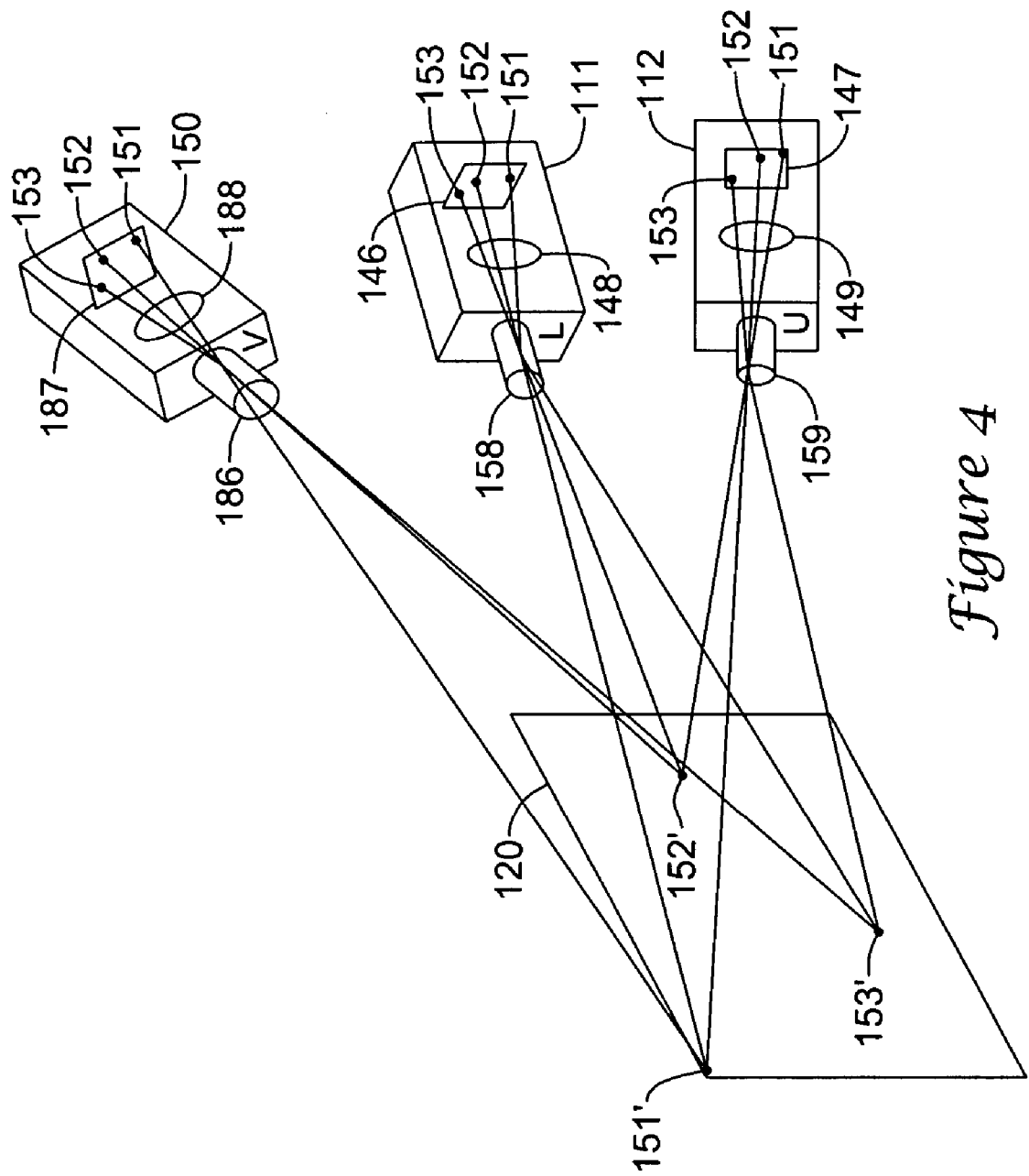
FIG. 4 illustrates a co-registration scheme for three cameras or arrays.

FIG. 4 illustrates the co-registration of cameras 111, 112, and 150 or like image detectors of a multi-band camera. There may be spatial and time registration between the cameras. The cameras may be of the same make and model. A difference between the cameras may be the optical bandwidth filters, 148 and 149, which are situated between sensing arrays 146 and 147 and camera lens 158 and 159, respectively, of cameras 111 and 112. Filter 148 may determine the 0.8 to 1.4 micron spectral sensitivity of array 146 in camera 111 and filter 149 may determine the 1.4 to 2.2 micron spectral sensitivity of array 147 in camera 112. A polarizer may be inserted in front of lens 158 of camera 111 and in front of lens 159 of camera 112. Or instead, a polarizer may be inserted between lens 158 and array 146 of camera 111, and between lens 159 and array 147 of camera 112. There may or not be a filter 188 between sensing array 187 and lens 186, or a polarizer proximate to lens 186 of visible band camera 150. Sensing arrays 146, 147 and 187 of the cameras may be the same size, for example, 512 by 512 pixels in a gallium arsenide substrate or other kind of substrate. Typically, the fields of view are the same for each array. Three pixels 151, 152, and 153, for example, may be selected out as examples of spatial co-registration. Each of the three pixels may be focused on corresponding portions 151', 152', and 153', respectively, of image 120 viewed by cameras 111, 112 and 150. That means the arrays may have the same images, pixel for pixel, even though the spectral sensitivities are different. In other words, the columns and rows of pixels may be aligned with the physical world scene, pixel for pixel. Once spacially co-registered, cameras 111, 112 and 150 may be kept stationary relative to the physical world.

Time co-registration of the cameras may mean that the cameras are in synchronization with each other from a signal perspective. The signals for each of the two corresponding pixels may go to a frame buffer at the same time. The retention of light for each pixel may be in the micro-second range. A typical frame time may be about 33 milliseconds, which is 30 frames per second. The transfer of pixel data may be parallel, line-by-line, or serial, pixel-by-pixel, or any other style of information transfer. There may be a sync signal for cameras 111, 112 and 150 to initiate and maintain their time co-registration.

The image outputs or pixel signals 115 and 116 may go to a software process or specialized hardware 117 which provides a certain weighting to each of the pixels and fuses pairs of corresponding pixels from cameras 111 and 112, respectively, into single pixels. The weighted differencing may be performed pixel by pixel. Each result may be the fused pixel of the two weighted differenced pixels. The weight difference equation for such fusing may be $$P(i,j)_{fused} = P(i,j)_{lower\ band} - C \cdot P(i,j)_{upper\ band}.$$

P is spectral power. The position or location of each pixel in the respective image may be identified by row (i.e., "i") and column (i.e., "j"). The rows and columns of pixels of the images of cameras 111 and 112 may coincide with each other. The lower band pixels may be from camera 111 and the upper band pixels may be from camera 112. The spectral power "P" for each pixel at i,j may be indicated by a numeral scale of brightness from 0 to 255. "0" may be entirely black or dark (i.e., no spectral power) and "255" may be entirely white or bright (i.e., full spectral power). Numerical indications in between 0 and 255 may be representative of various gradations of gray, brightness, or spectral power. "C" of the equation is a constant (i.e., weighting factor), which may be determined according to the lighting of background or scene 120 and object or face 113. "C" for daytime lighting conditions is about "3" for optimal results. "C" for nighttime depends upon the spectral distribution and properties of the artificial illuminator 114.

The brightness or spectral power of a typical pixel of the lower band (image 146) may be 55 and the brightness or spectral power of the corresponding typical pixel of the upper band (image 147) may be 10. These upper and lower band pixel values may be representative of skin in the corresponding bands. The spectral power of a resulting typical fused pixel, in daytime viewing, at a location of row i and column j in the daytime may be determined with the following calculation.

$$P(i,j)_{fused} = 55 - 3 \cdot 10$$

$$P(i,j)_{fused} = 55 - 30 = 25$$

The fused pixel signals may go from software process or specialized hardware 117 to software process or specialized hardware 118 for image segmentation via thresholding of the fused pixels. Process or specialized hardware 118 may emulate a comparator-like circuit in that each fused pixel below a certain threshold value (T) is assigned a value ($V_1$) of 0 and each fused pixel above the certain threshold value is assigned a value ($V_2$) of 255. Output 183 may go device 182 as described herein.

Figure 5:
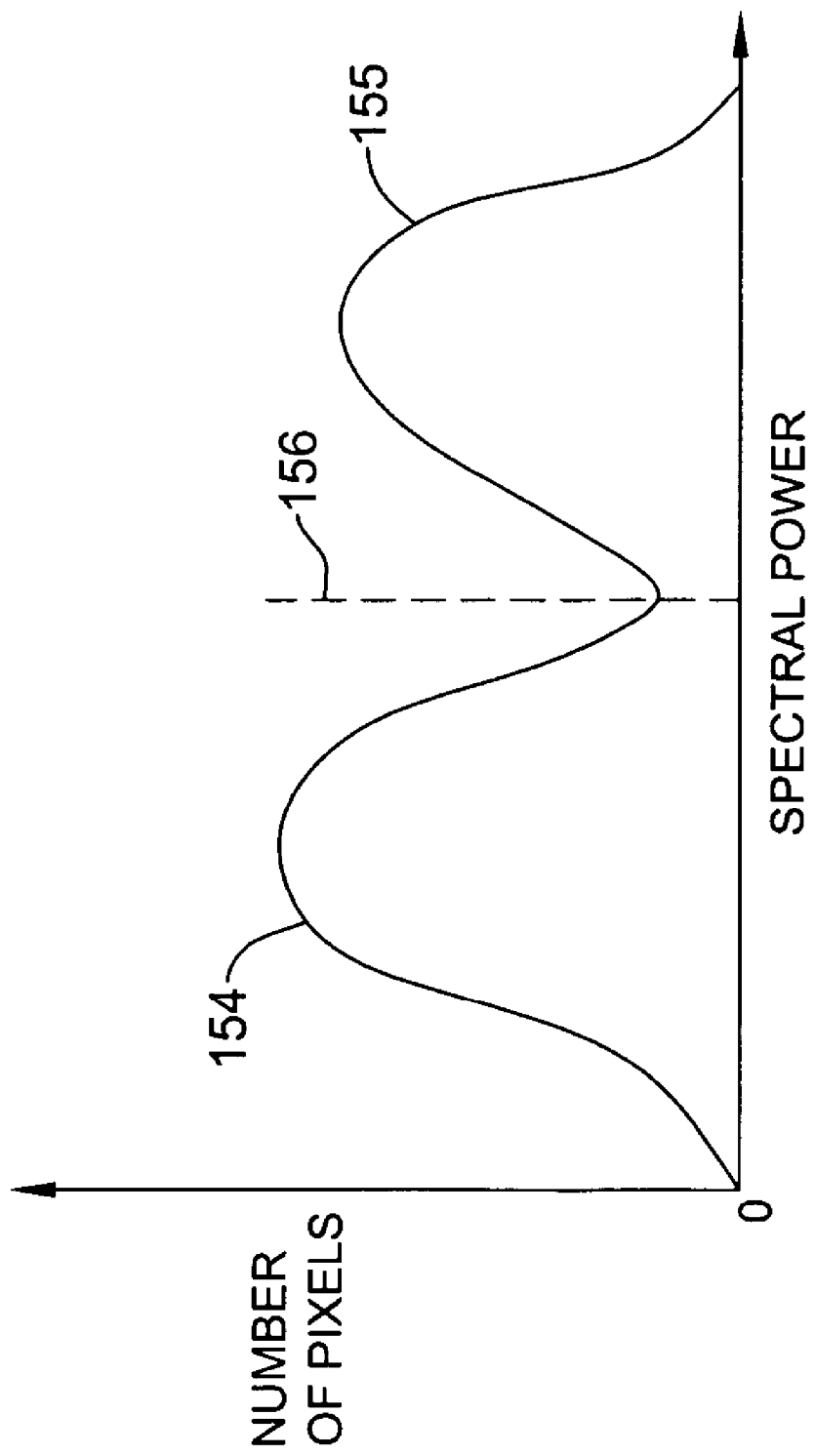
FIG. 5 is a histogram of the number of pixels versus spectral power for an image frame.

FIG. 5 shows a histogram of an image frame of fused pixels. The number of pixels for each spectral power value may be indicated by curves 154 and 155 for a given sensed image. The pixels of curve 154 may represent background 120 and the pixels of curve 155 may represent human skin 113. Curves 154 and 155 may intersect at 156 which may be deemed to be the appropriate value for thresholding. If curves 154 and 155 do not intersect, then the thresholding value 156 may be centered between curves 154 and 155. The threshold value is dynamic in that it changes from frame to frame, and may be determined for each image frame according to the histogram of the respective frame. If the spectral value for thresholding is 20, then fused pixels having a value below 20 may be valued at 0 and fused pixels having a value above 20 may be valued at 255. The resulting image in display 119 may have white pixels for background 120' and black pixels for face 113'. This image may be reversed by process or specialized hardware 118 such that background 120' has black pixels and face 113' has white pixels.

A main application of the system may be people detection in places such as parking lots, crowds, stores, airports, military areas, jungles, vehicles, security points, alert areas, and so forth.

Figure 6:
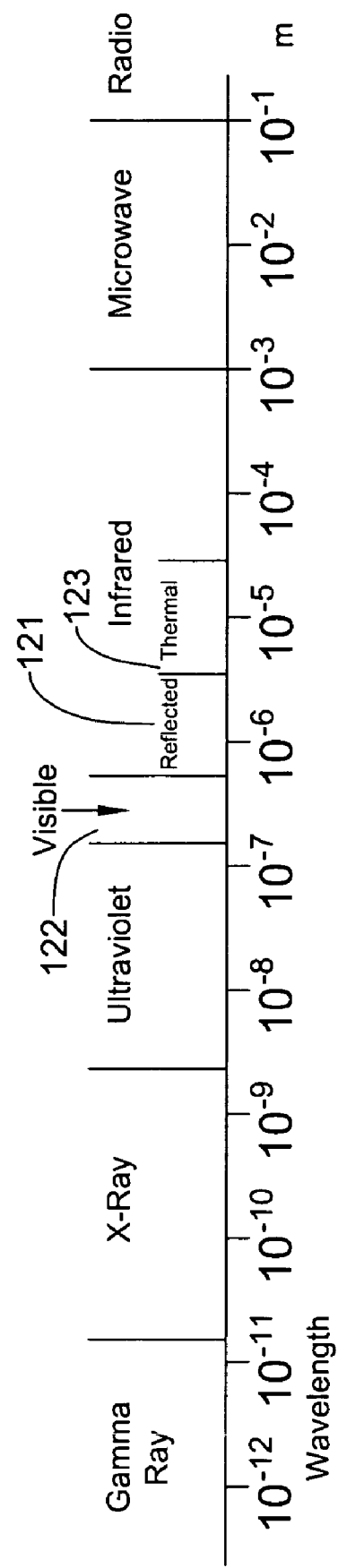
FIG. 6 is the graph of the electromagnetic spectrum.

The spectrums, where cameras 111 and 112 function, may be within the reflected infrared portion 121 in FIG. 6 which shows the EM spectrum. Visible spectrum 122 may be the spectral sensitivity of camera 150. Visible light camera 150 may have an increased noise level that increases during poor environmental conditions such as bad weather, nighttime, and direct sunlight. Nighttime viewing may be overcome with artificial lighting, which matches the visible spectrum of the camera 150. A human face 113, which may be an object of interest, might not necessarily have consistent qualities within the visible range. Human faces may appear dark or light, depending on the physiological characteristics of the occupant, and the intensity and incident angle of illumination.

The thermal infrared band 123 (3.0 to 5.0 and 8.0 to 14 microns) may be associated with thermal properties of materials. The human body typically may be at a temperature of 37 degrees C. This means that human faces may have a consistent light color in thermal infrared imaging, despite various facial colors, which seems contrary to visible imaging.

The thermal property of the body may provide a clear differentiator from look-alike dummies. The thermal infrared sensor may function at night without an external illuminator. One disadvantage of using the thermal infrared band 23 for occupant detection is that vehicle windshield glass may greatly attenuate infrared light transmission at 2.8 microns and higher.

Figure 7:
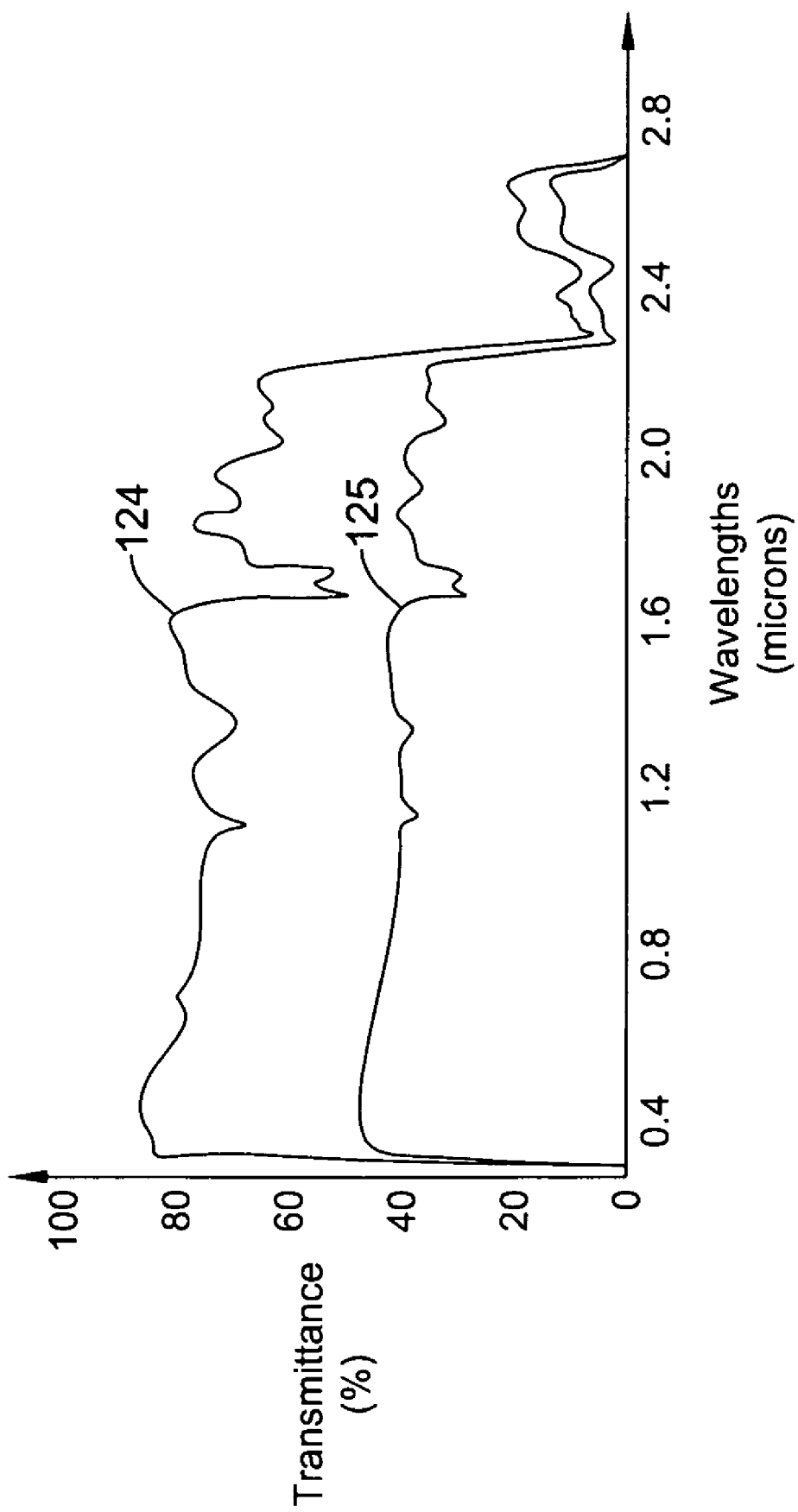
FIG. 7 reveals the infrared transmittance characteristics for an automobile windshield.
Figure 8:
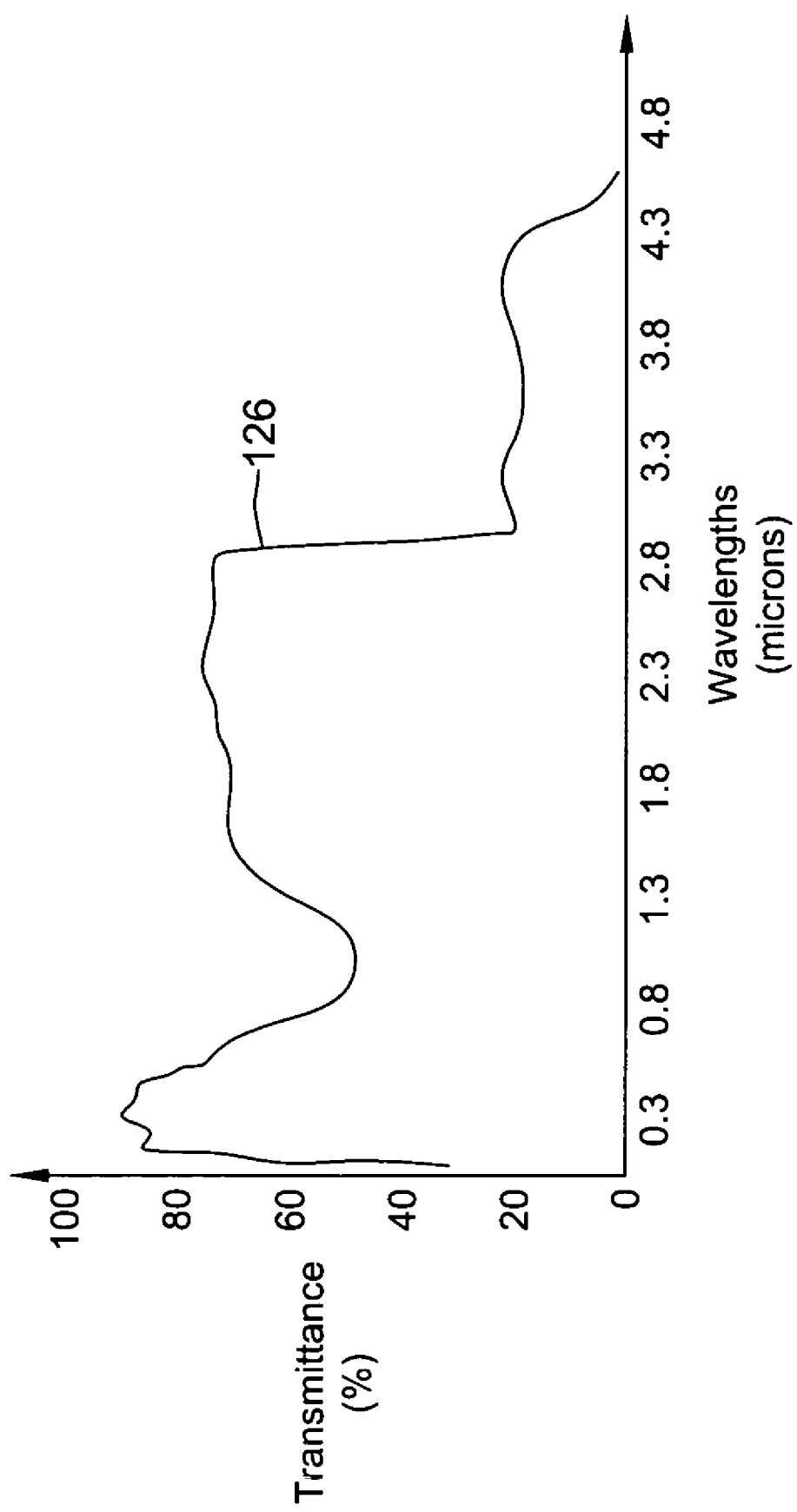
FIG. 8 reveals the infrared transmittance characteristics for an automobile side window.

FIG. 7 reveals the transmittance characteristics of infrared light between 0.4 and 2.8 microns for a clean vehicle windshield (curve 124) and a dirty windshield (curve 125). Beyond 2.8 microns of thermal infrared bandwidth 123, the radiation transmittance characteristic of windshield glass may be almost zero. The transmittance of a lightly tinted side window of a vehicle may be good (50 to 85 percent), from 0.3 up to 2.8 microns as revealed by curve 126 in FIG. 8. Between 2.8 and 4.3 microns, the radiation transmittance is about 20 percent for the side vehicle window. Beyond 4.3 microns the transmittance drops to nearly zero. However, the spectral behavior of the side window may permit transmittance of some thermal radiation.

Figure 9:
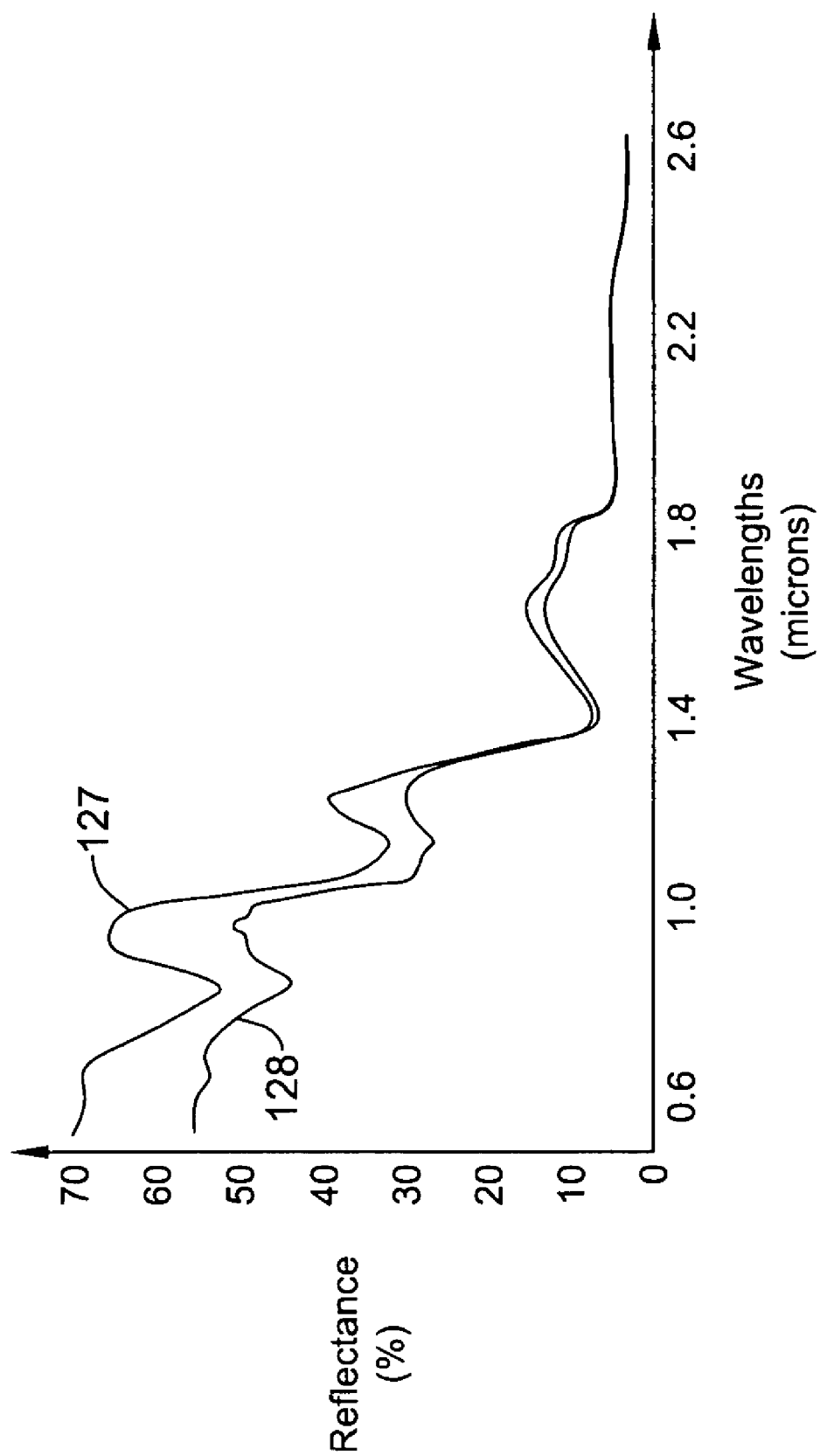
FIG. 9 is a graph showing the percentage of reflectance for Caucasian males of light and dark complexions.

Curves 127 and 128 of FIG. 9 show the percentage of reflectance of infrared light for light and dark complexion Caucasian males, respectively. The reflectance is good between 0.6 and 1.4 microns. Above 1.4 microns, the reflectance is significantly diminished. However, the difference of reflectances of light and dark complexions is minimal.

Figure 10:
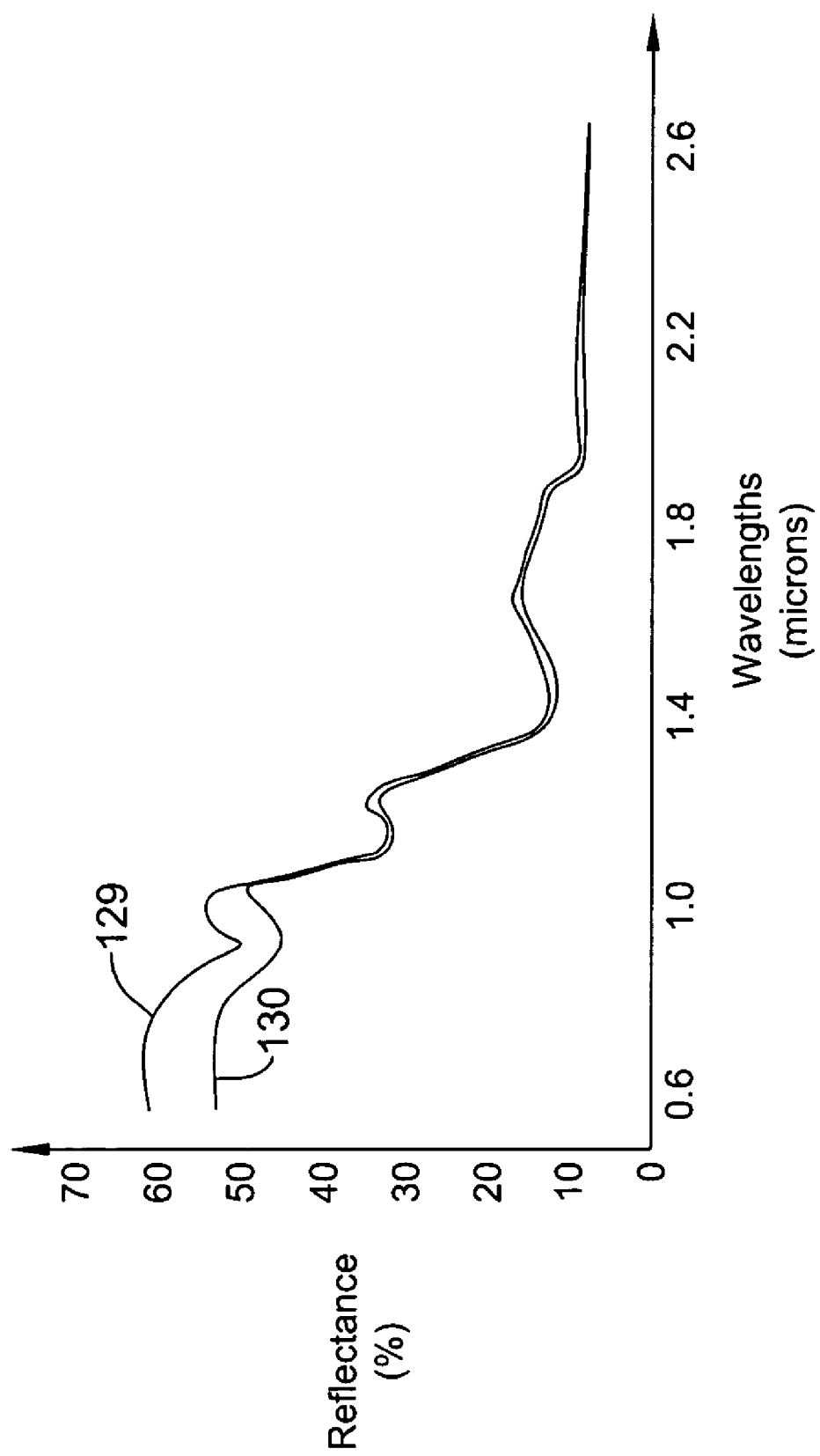
FIG. 10 is a graph showing the percentage of reflectance for Asian males of light and dark complexions.
Figure 11:
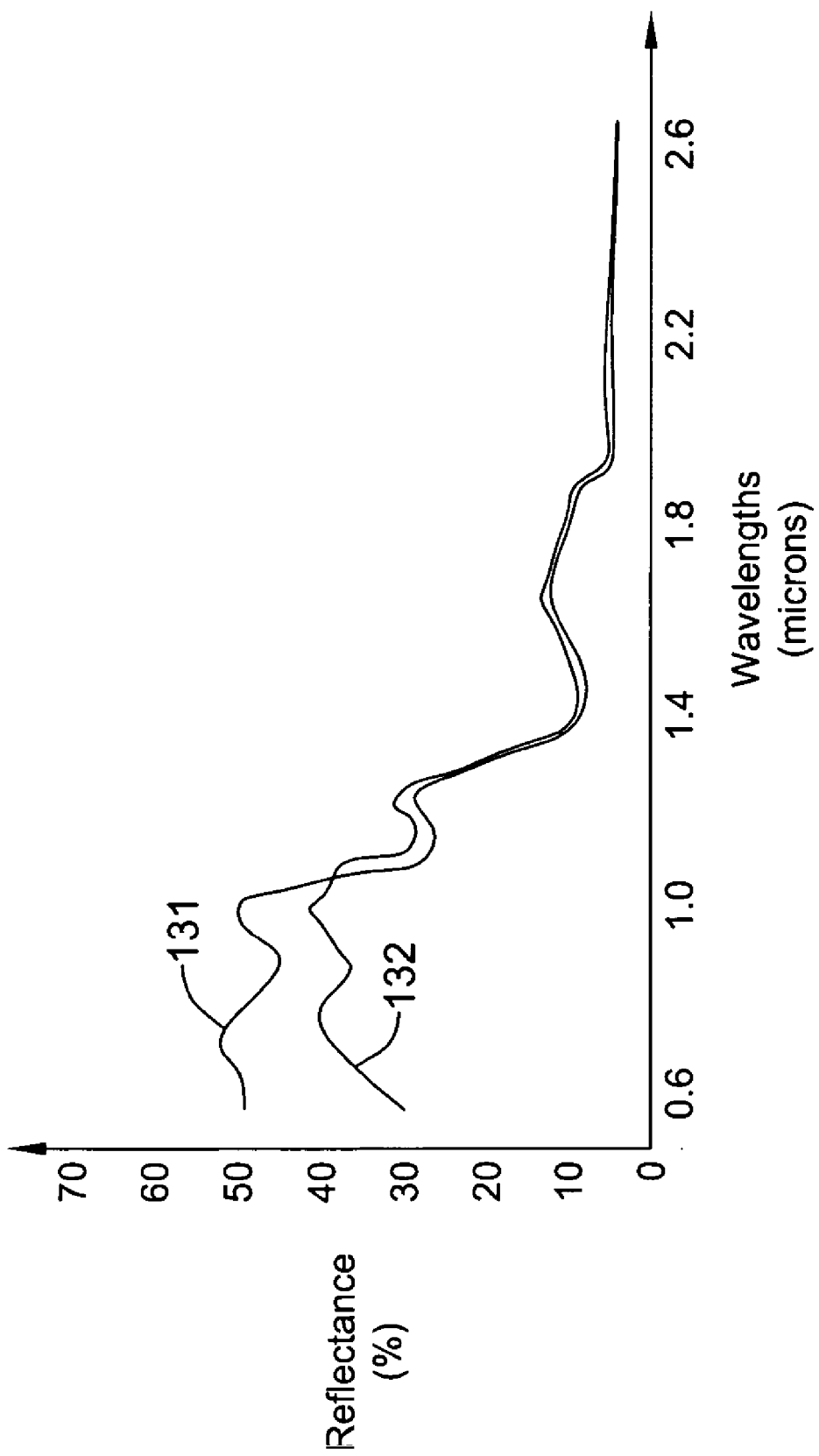
FIG. 11 is a graph showing the percentage of reflectance for black males of light and dark complexions.

In FIG. 10, curves 129 and 130 show skin reflectances for light and dark complexions, respectively, of Asian males. Curves 131 and 132 of FIG. 11 show skin reflectances for light and dark complexions of black males. Even though the reflectances of light complexions may be higher than those of dark complexions; curves 127, 128, 129, 130, 131 and 132 of FIGS. 9-11, respectively, have similar shapes and all of them appear to drop off at about 1.4 microns. These reflectances may reveal some variation for all complexions of the Caucasian, Asian, and black males, between 0.6 and 1.4 microns.

Figure 12:
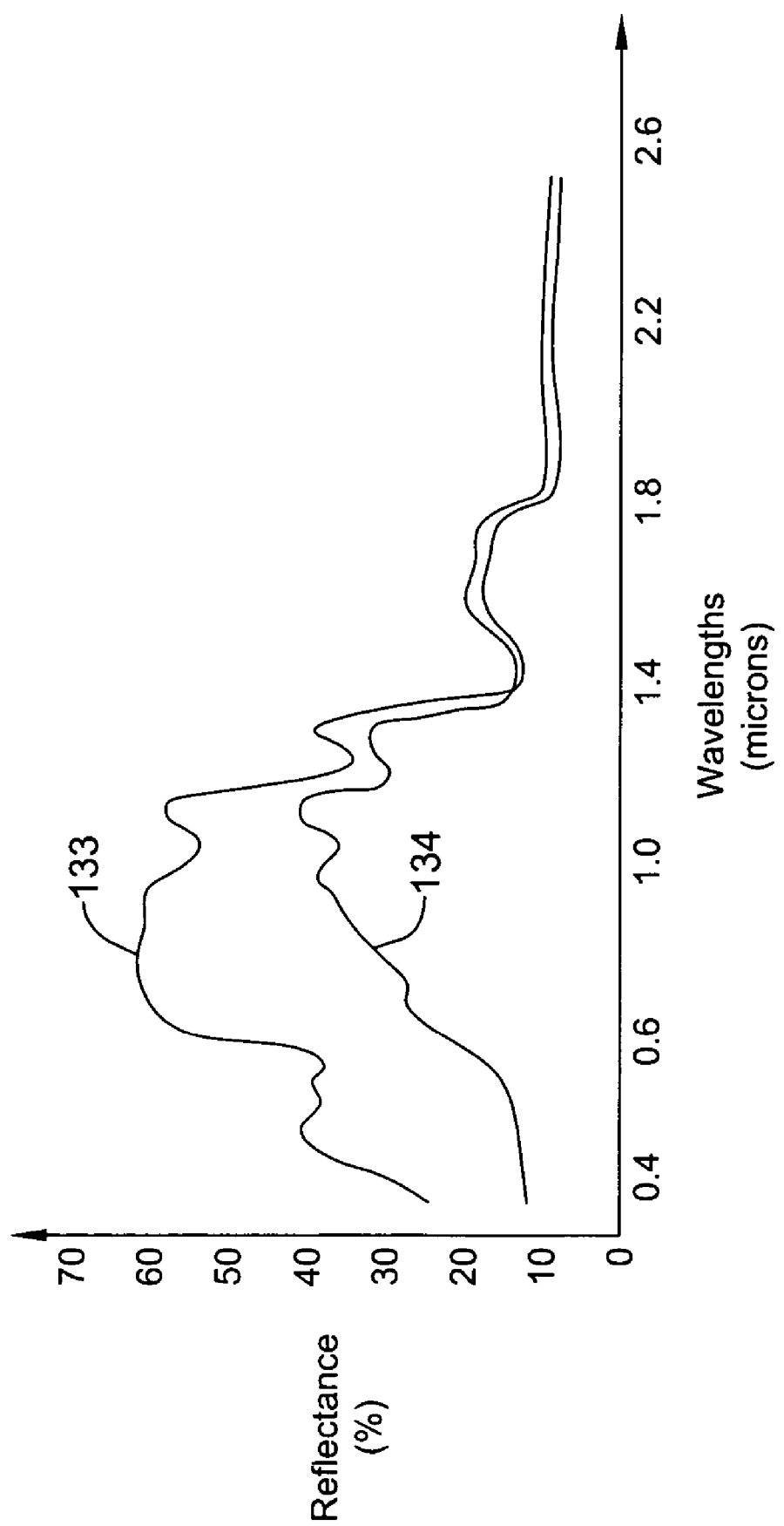
FIG. 12 is a graph showing a comparison of reflectances for light and dark skin.

Curves 133 and 134 of FIG. 12 may show the reflectances for more extreme differences of light skin and dark skin, respectively. The reflectances of light and dark skin may be significant up to 1.4 microns. After 1.4 microns, reflectance curves 133 and 134 for light and dark skin, respectively, may become almost coincident and the resultant reflectances may drop below 20 percent. Thus, in the reflective-infrared bands of 1.4 microns and above, the reflectances of detected humans of all kinds of skin shade may be about the same at wavelengths greater than 1.4 microns.

Figure 13:
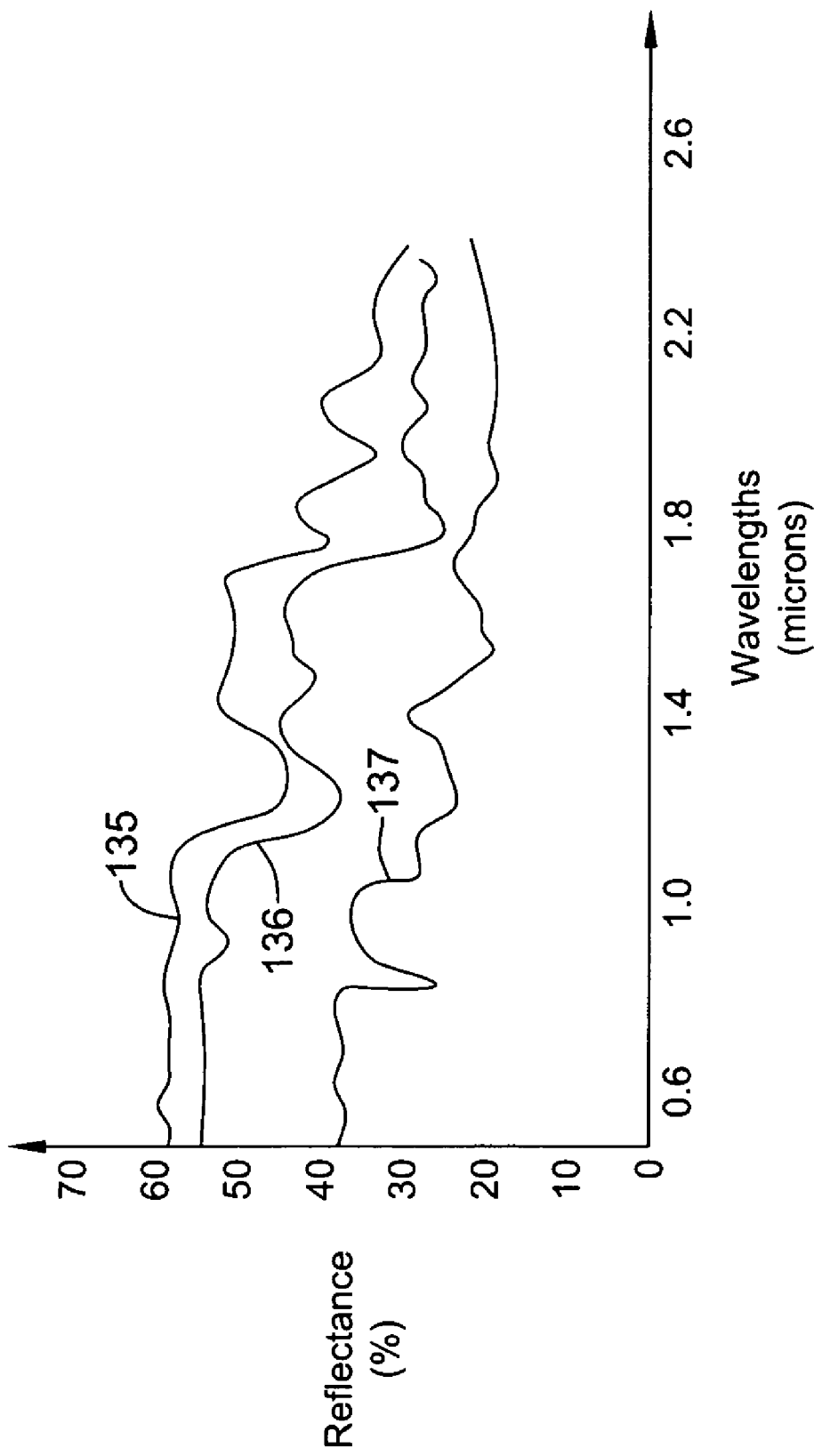
FIG. 13 is a graph of reflectances for cotton, wood and polyamide.

In FIG. 13, curves 135, 136, and 137 show the reflectance for cotton, wood, and polyamide respectively, to be significant not just between 0.6 and 1.4 microns, but beyond 1.4 microns. The insignificant drop in reflectance after the 1.4 micron threshold point may be a basis that shows a large contrast in reflectance between the human face and inanimate objects, such as upholstery, the dashboard, and fabrics in a vehicle, which are background, and may provide for easy detection of the human face in the range of 1.4 to 2.2 microns.

Consequently, there may be a significant contrast, in reflectances between the images of a Caucasian male and a dummy head from a camera operating in the range between 1.4 and 2.2 microns. The image of the dummy may be reflective and appear rather bright and the male human image may be non-reflective and appear dark, and thus the resultant contrast between the two images appears to be rather stark. The person detection scheme seems superior to visible light imaging, since the latter scheme reveals little or no contrast between the Caucasian and dummy heads of like colors. Thus, it may be easy to distinguish images of the human head from those of the dummy head in the 1.4 to 2.2 micron range imagery, but not be necessarily easy to distinguish the images of those respective heads from each other in the 0.8 to 1.4 micron range imagery.

Figure 14:
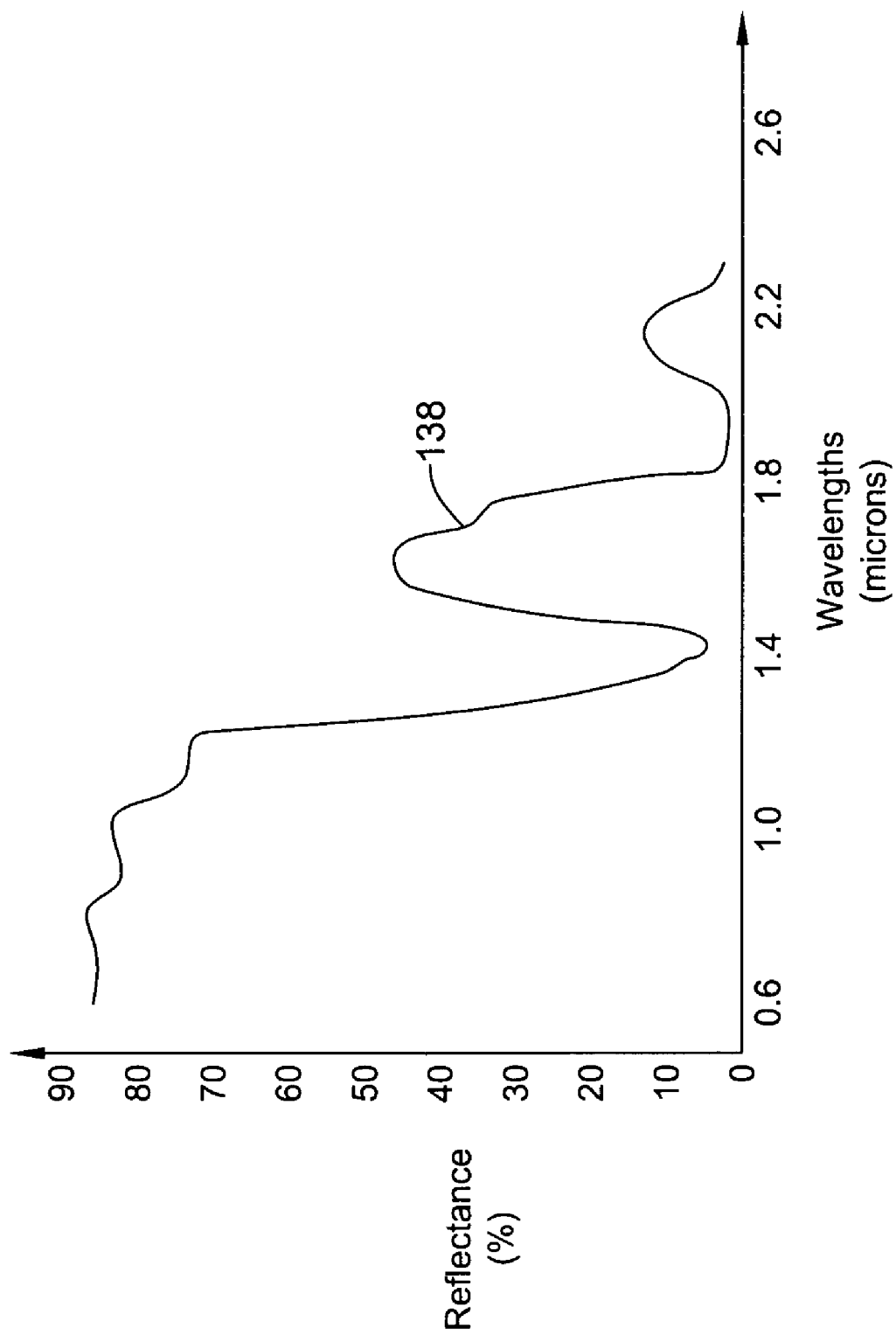
FIG. 14 is a graph of reflectance for distilled water.

The lower reflectivity of human skin for the 1.4 to 2.2 micron spectral range may be explained by the spectral reflectance of distilled water as shown by curve 138 of FIG. 14. There is a substantial drop in reflectance at about 1.4 microns. Beyond 1.4 microns, the water absorbs substantial infrared radiation and appears in an image as a dark body. Since the composition of the human body consists of 70 percent water naturally, its spectral response may be similar to that of water. So camera 112, operating in the 1.4 to 2.2 micron range, may capture this unique human body differentiator. With the operating range of camera 112, one may safely use during the nighttime the matching reflective-infrared illumination source 114 to improve the quality of the sensed image of face 113. The light of source 114 may be invisible to humans, but also harmless to their eyes since the wavelength of illuminator or source 114 may be in a safe range.

Also, since cameras 111 and 112 of system 110 may operate at a lower band than the mid-infrared band, glass penetration should not be a problem and cameras 111 and 112 may easily detect through the frontal windshield of a vehicle, a building window such a door, a glass observation panel, or the like. Thus, speed requirements for cameras 111, 112 and 150 may be less restrictive. For an instance at a highway site, a zoom lens may be used with the camera arrangement for detection and observation of people.

Figure 15:
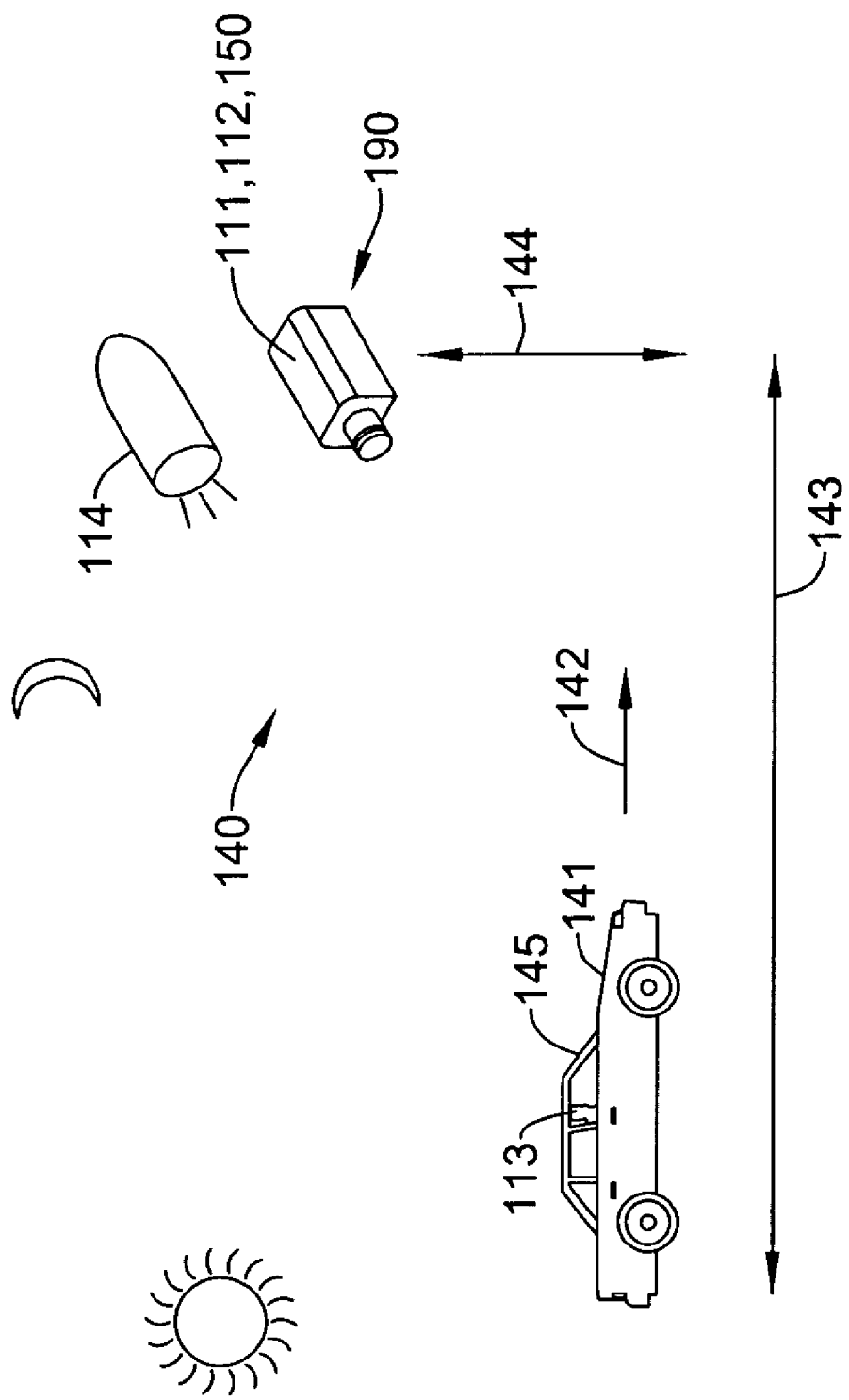
FIG. 15 shows a layout for determining the speed characteristics of a human detection system.

FIG. 15 shows an illustrative example involving a layout of a reflective-infrared and visible system 140 for determining the speed characteristics of the human detector. A vehicle 141 may be assumed to be moving down a highway at a velocity v, as shown by vector 142, and be observed in a frontal view with a reflective-infrared camera 111, 112 or 150 at a distance d, as shown by line 143, and from a height h, as shown by line 144. Only one of the cameras 111, 112 and 150 may be needed for this evaluation, but it may be either one of them. Cameras 111 and 112 may be a Sensors Unlimited Inc. SU 320 equipped with a telephoto lens, a band-pass filter in the range of about 0.8 to x microns (where x>0.8 microns), and a polarizing filter to reduce the glare effect from the sun illumination during daytime. The visible camera may another camera having the same pixel layout and similar electronics for integration with the other cameras.

During the daytime, system 140 may have adequate illumination from the sun. There may be an appropriate geometric arrangement for cameras 111, 112 and 150 so that the signal to noise (S/N) ratio and the camera speed can be kept at acceptable levels even under adverse conditions. The speed quality may be considered acceptable when the image smearing does not exceed the width of one pixel.

The first step in a radiometric computation may be to determine the amount of IR radiation that falls upon the objects of interest such as the occupants of vehicle 141. The spectral band considered may be above the 1.4-micron threshold point. Because of constraints due to the quantum efficiency of the camera SU-320 that may be used in the experiments, one may limit the spectral band in the range of 1.4 to 1.7 microns. Slightly modified things may be in effect for the extended range of 1.4 to 2.2 microns. The spectral irradiance of the sun (the illumination source) on a clear day at sea level may be approximately $I_{sunny}$=0.008 Watts/cm² in the 1.4 to 1.7 micron band range. In this computation, however, one may consider the worst case scenario of an overcast day. For an overcast day, the irradiance value may be reduced by $10^{-3}$ thus giving irradiance at vehicle 141 of approximately $$I_{overcast} = 10^{-3} * I_{sunny}$$
$$= 10^{-3} * 0.008$$
$$= 8 \text{ microwatts/cm}^2.$$

The transmittance in this spectral range of windshield 145 of vehicle 141 may be approximately 0.4 resulting in an irradiance on the vehicle occupants of $$I_{occupant} = 0.4 * I_{overcast}$$
$$= 0.4 * 8$$
$$= 3.2 \text{ microwatts/cm}^2.$$

The second step in a radiometric computation may be to determine how much of the incident radiation on the objects of interest is reflected back to the sensor (i.e., reflective-infrared camera 111, 112). The radiance into a hemisphere assuming a reradiate of 0.4 may be $$R_{occupant} = 0.4 * I_{occupant} / \pi$$
$$= 0.4 * 3.2 / \pi$$
$$= 0.4 \text{ microwatt/cm}^2\text{-steradian}$$

This may represent the reflected portion of the occupant irradiation. The occupant's body may absorb the rest. The reflected radiation may pass through windshield 145 and the camera 111, 112 lens to reach the reflective-infrared sensor arrays 146 and 147 of cameras 111 and 112, respectively. Camera arrays 146, 147 and 187 may be in a one camera 190. There may be assumed a 0.4 windshield transmittance, an f/2 camera lens (i.e., having a 14.32 degree cone angle) with 0.8 transmittance, a polarizer with 0.4 transmittance, and a band-pass filter with 0.6 transmittance. Then, the irradiance at the sensor arrays of camera 190 may be $$I_{camera} = 0.4 * 0.8 * 0.4 * 0.6 * \pi * R_{occupant} * \sin^2(14.32°)$$
$$= 0.4 * 0.8 * 0.4 * 0.6 * \pi * 0.4 * \sin^2(14.32°)$$
$$= 0.006 \text{ microwatt/cm}^2.$$

Camera 190 may have square pixels with a side of $37.5*10^{-4}$ cm or an area $$A = 37.5 * 10^{-4} * 37.5 * 10^{-4}$$
$$= 1.40 * 10^{-5} \text{ cm}^2.$$

Consequently, the radiant power on the camera 190 pixel may be $$P_{pixel} = A * I_{camera}$$
$$= 1.4 * 10^{-5} * 0.006$$
$$= 0.084 * 10^{-12} \text{ watts}.$$

The camera's detectivity D* may be D*=$10^{12}$ cm Hz/Watts. The noise equivalent power (NEP) may be related to detectivity D*, pixel area A, and electronic bandwidth Δf by the following equation NEP=$(A/\Delta f)^{1/2}/D^*$.

The bandwidth Δf may be determined by the exposure time of camera 190. The exposure time may depend on vehicle 141 velocity 142, camera range 140, and the camera 190 field of view such that the images smear less than one pixel. Assuming vehicle 141 traveling at a speed of 65 mph, at a distance d 143 of 40 meters (m) away from camera 111, 112, and with a field of view of 1.6 m, the 320×240 pixel array of camera 190 may give a maximum exposure time of 1 ms or a bandwidth of Δf=1 kHz. Substituting the values for A, Δf, and D* in the formula of NEP, one may get NEP=$1.18*10^{-13}$ watts.

Therefore, the signal to noise ratio S/N may be

S/N=$(P_{pixel}$/NEP)=0.7.

Assuming a worst case scenario (overcast day, dirty windshield, dark occupant skin), one may determine that camera 190, equipped with an f/2 lens, a 1.4 to 1.7 micron filter, and a polarizer, if it is positioned at a distance 143 of d=40 m from incoming car 141 and at a height 144 of h=7 m at the specified distance 143, will achieve an acceptable smear of less than one pixel since the required exposure time of 1 ms is within the camera's speed capabilities. The signal to noise ratio (S/N) may be 0.7. To boost the S/N ratio to a higher value on overcast days, one may employ an illumination source 114. Illumination source 114 may also be helpful during nighttime. The spectral signature of illuminator 114 for the 1.4 to 1.7 micron wave-band might be safely employed on occupants and drivers of moving vehicles.

Post processing may include a neural network that performs automatic vehicle occupant detection. The vehicle occupant detection approach may be based upon a fuzzy neural network algorithm. An exact binary image may be provided by the fusion approach described and facilitate high correct detection rates.

Figure 16:
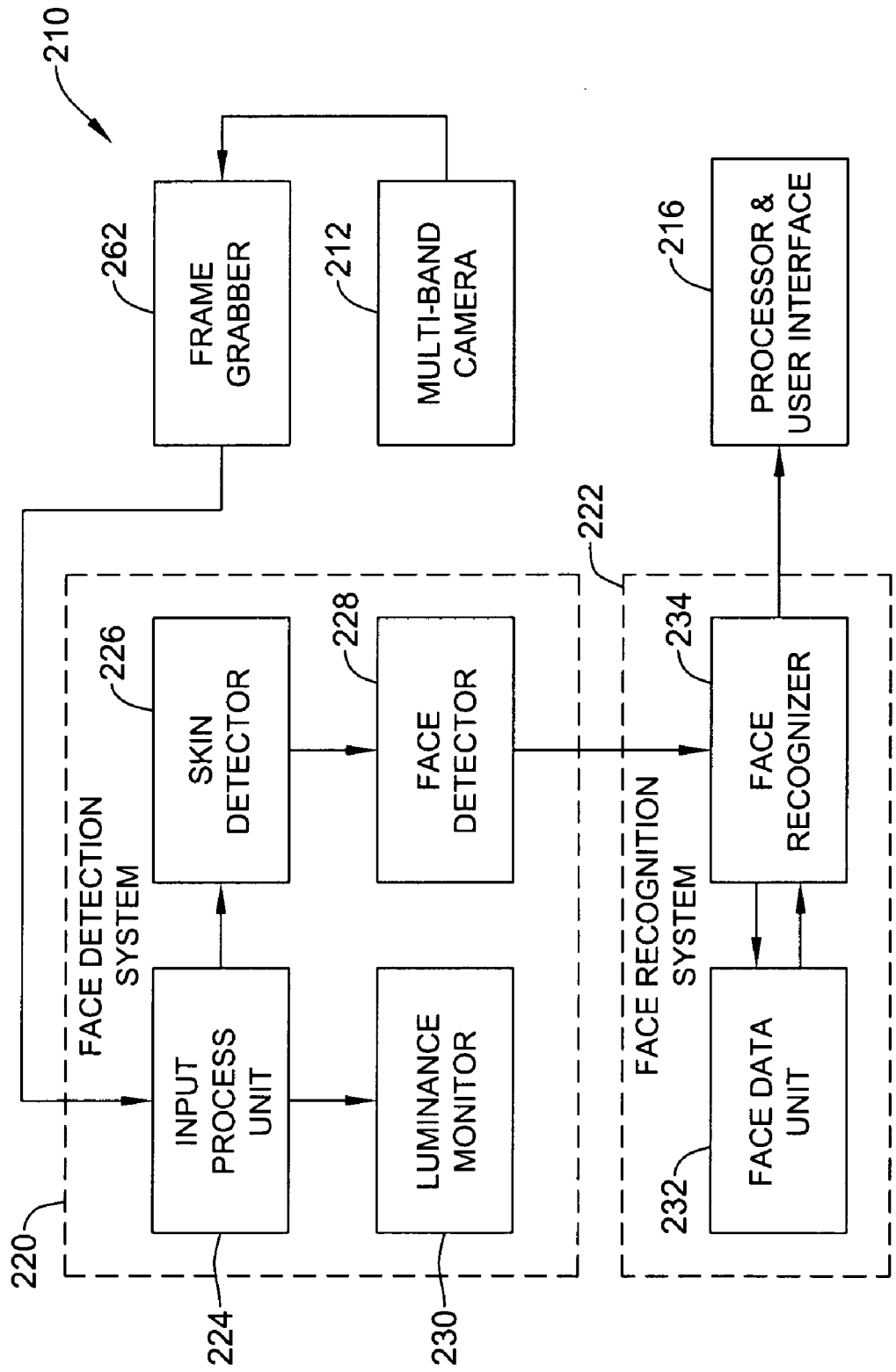
FIG. 16 shows a general illustrative example of an infrared system for identifying humans using face detection and face recognition.

The face detection apparatus and system described herein may be used as a preprocessing phase for a face recognition technique as shown in FIG. 16. FIG. 16 shows a person identification system 210 which may be operable under control of a user at an interface of a processor 216 to implement face detection algorithms 220 in a pre-processing stage prior to application of face recognition algorithms 222.

Figure 17:
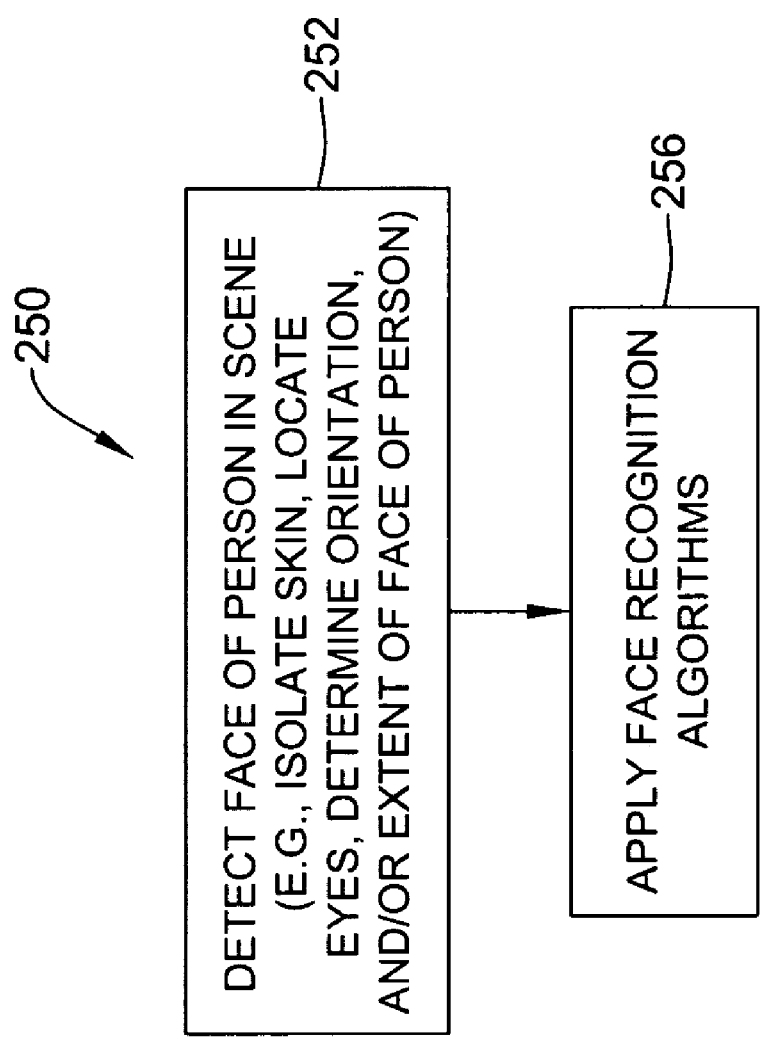
FIG. 17 shows an infrared identification system including a face detection process that can be implemented by the system of FIG. 16 for detecting faces of humans.

As shown in FIG. 17, a person identification system 250 that may be implemented with the system 210 of FIG. 16 may include detecting a face which exists in a scene being monitored (block 252), e.g., determining the location of eyes of the face for use in defining the orientation and/or extent of the face. With such information available from the face detection process, other face recognition algorithms 222 may be used (block 256).

Figure 18:
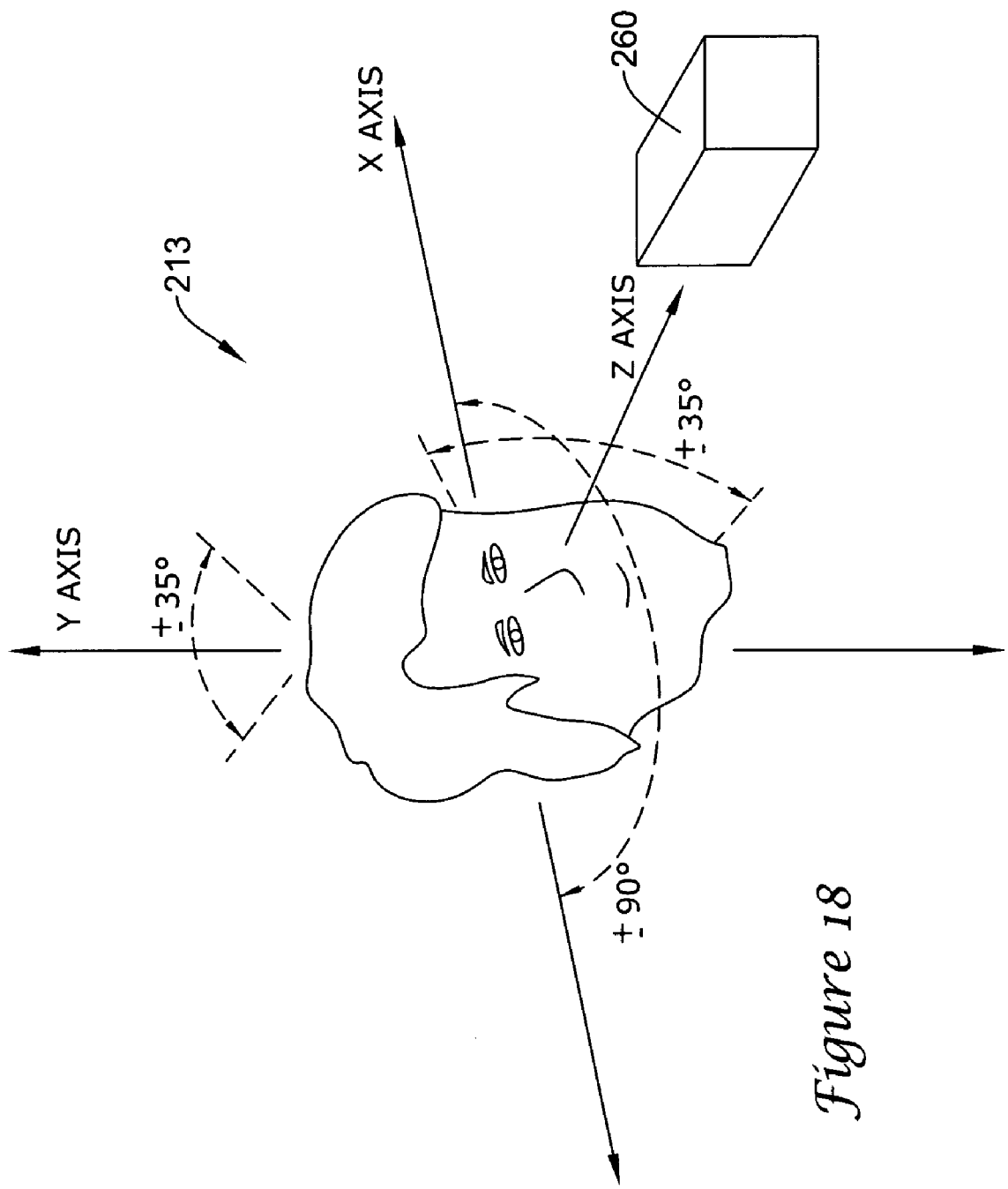
FIG. 18 shows an illustration for use in describing the possible orientation of a human head; which orientation can be at least partially estimated.

Face detection may be effective when the head of person is at various positions relative to the imaging devices acquiring data with regard thereto. For example, as shown in FIG. 18, the head of a subject facing forward as well as most degrees of rotation may be considered. Such degrees of rotation shown by the head in FIG. 18 may include head orientations within a −35 degree to +35 degree range around the z-axis, within a −35 degree to +35 degree range around the x-axis, and within a −90 degree to +90 degree range around the y-axis.

The face detection process 252, e.g., sub-system, of the person identification system 250 may include imaging hardware 212 and a computer apparatus 216 operable to apply face detection algorithms 220 to image data provided by the imaging hardware 212. After application of the face detection algorithms 220 and upon detection of a face of a person, image data representative of at least a portion of the person's face may be provided to the face recognition system, e.g., visible image data, reflective-infrared data, and the like, with information determined as part of the face detection process. For example, data representative of the center of eyes of the face detected, and/or one or more other facial features, may be provided to the face recognition system to allow effective analysis of the image data representative of the currently detected face in the scene being monitored.

The face recognition algorithms 222 may be any algorithms used for identification of an individual or analysis of an individual's face, e.g., reflective-infrared analysis. Such analysis may be used to determine the anxiety of a person. In the illustrative example shown in FIG. 16, the face recognition algorithms 22 may include a face data unit 232 for storing data representative of individuals, e.g., facial features, facial images, facial signatures, and the like.

The face recognition algorithms 222 may further include face recognition analysis tools 234 for analyzing image data concerning the face detected by one of more of the face detection techniques described herein. For example, the analysis tools 234 may be operable to compare stored data of face data unit 232 to features of image data provided regarding the detected face, e.g., visible image data, reflective-infrared image data, or any other data that may be beneficial in the identification of an individual or even be beneficial in the assessment of an individual's intent, e.g., terrorist, smuggling, and so forth.

One or more of the face detection techniques described herein may be used to modify or be incorporated into currently available face recognition systems. In one illustrative, one or more of the techniques may be incorporated into a system that includes the face recognition engine FaceIt.RTM available from Visionics (Jersey City, N.J.). Since FaceIt.RTM may rely primarily on facial geometry for face recognition, it might be invariably applied to visible as well as reflective-infrared imagery. In other words, the nominal face detector in the FaceIt.RTM system may be replaced with the face detector.

Figure 19:
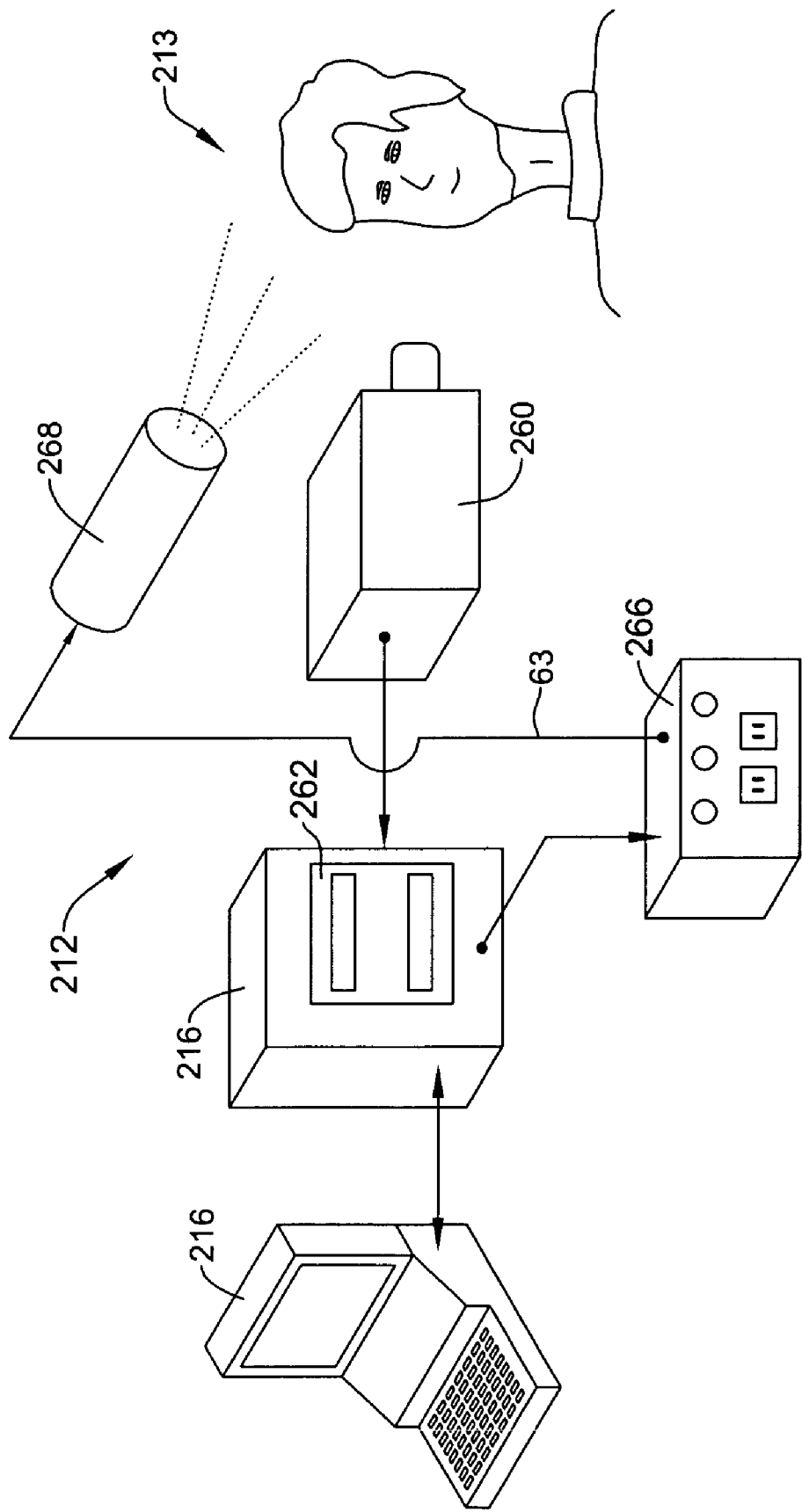
FIG. 19 shows an illustrative example of a system for implementing at least face detection.
Figure 20:
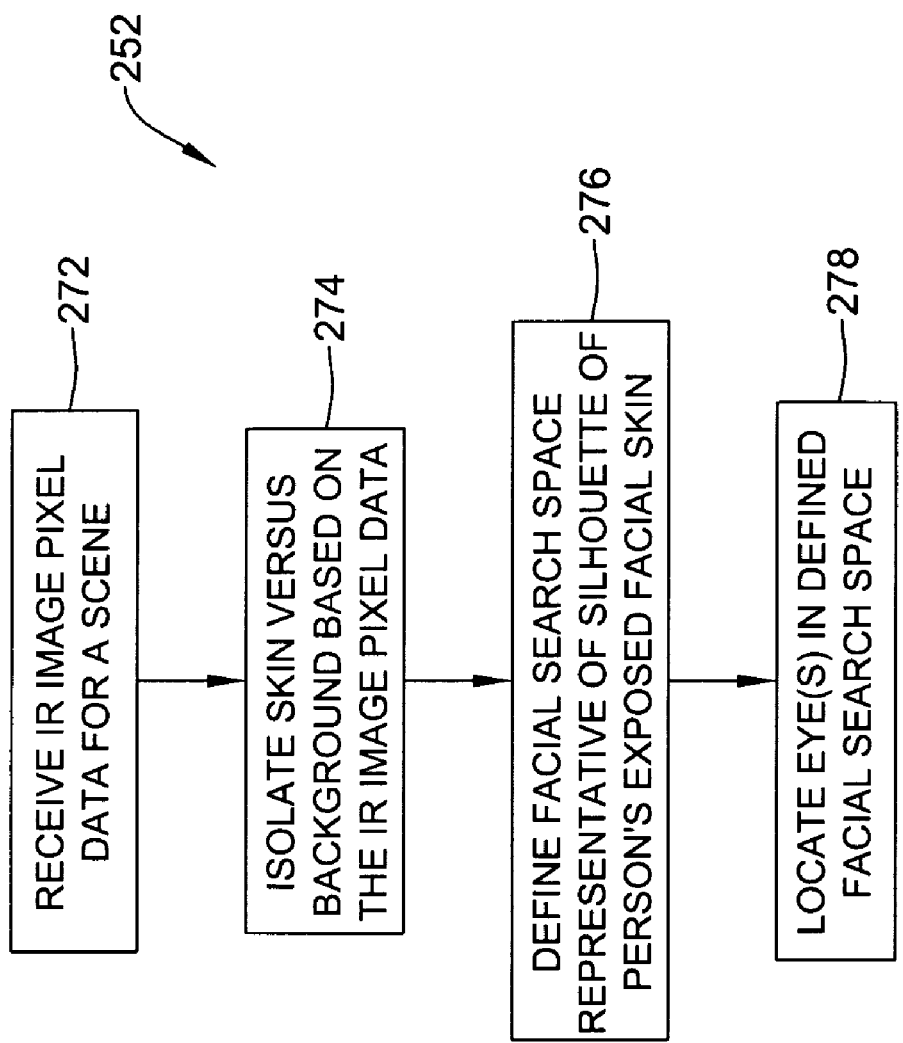
FIG. 20 shows one illustrative example of a face detection system illustrated generally in FIG. 17.

Various imaging hardware system configurations 212 may be used in the implementation of the face detection process to provide reflective-infrared image pixel data for a scene (block 272 as shown in FIG. 20). However, as shown in FIG. 19, the imaging hardware configuration 212 may include a multiple reflective-infrared band camera approach. The system may use a camera 260 (i.e., incorporating the arrays 146 and 147 of cameras 211 and 212) as the input medium. The camera 260 may be sensitive to the so called reflective-infrared spectrum in the range of about 0.9 microns to about 1.7 microns. This range falls within the reflected portion of the infrared spectrum and has no association with thermal emissions.

In one illustrative example, as may be further described herein, the two arrays 146 and 147 of camera 260 may be set at perpendicular angles with a beam splitter used to allow both arrays of camera 260 to view the scene from the same vantage point, yet in different wavelength bands. The splitter may divide the light reflected from the scene into a lower band beam of about 0.9 microns to about 1.4 microns in the reflective-infrared spectrum and the upper band beam of about 1.4 microns to about 1.7 microns. The two beams may be funneled to the sensing focal plane arrays (FPA) of the camera 260. Each array may be connected to a frame grabber 262, which digitizes the incoming image data, e.g., video, for transfer to the computer 216.

A luminance monitor component 230 of the software 220 running on the computer apparatus 216 with the frame grabbers 262, may analyze the luminance in the incoming frames of image data. The system may then control an illumination source 268, e.g., a reflective-infrared lamp to provide the desired illumination of the scene. For example, the system may appropriately adjust the output voltage on a programmable power supply unit 266 connected to the computer 216 via the serial port. The power supply 266 may provide power for the reflective-infrared lamp 268 that illuminates the scene. Through this feedback, the system may keep the scene at a constant luminance regardless of external conditions.

In other words, a computer controlled reflective-infrared illumination source may be added to the system to maintain optimal illumination levels in the scene at all times. For example, a photometer may be used to sense scene illumination and provide a signal to initiate the need for computer adjustment of the illumination source. As opposed to constant illumination of the scene, the lamp 268 may be strobed when a subject gazes at the system unknowingly for too long.

Generally, the face detection algorithms 220 operable on the reflective-infrared image data provided by the imaging device hardware system 212, such as described above, may include four units or modules as shown in FIG. 16. The face detection algorithms 220 are operable for use in carrying out the face detection method 252 shown in FIG. 20.

The face detection system 252 may include receiving reflective-infrared image pixel data for a scene, or in other words, recognizing the reflective-infrared image data provided by the imaging device hardware system 212 (block 272). Skin in the scene may be isolated versus background based on the reflective infrared pixel data and be indicative of a face in the scene (block 274). Thereafter, if skin is isolated in the scene, a facial search area or space may be defined that limits the region of the scene in which a search for eyes of a person can be conducted (block 276). For example, the facial search space may be refined by various imaging techniques to present a search space representative of a silhouette of the detected person's exposed facial skin. After the facial search space has been defined, an eye location process may be applied to locate the eyes in the defined facial search area (block 278).

The input process unit 224 may acquire the input images for both upper and lower reflective-infrared bands from the frame grabbers 262 (block 272). The images may then be aligned and sent to the luminance monitor 230 and the skin detector module 226.

Figure 21:
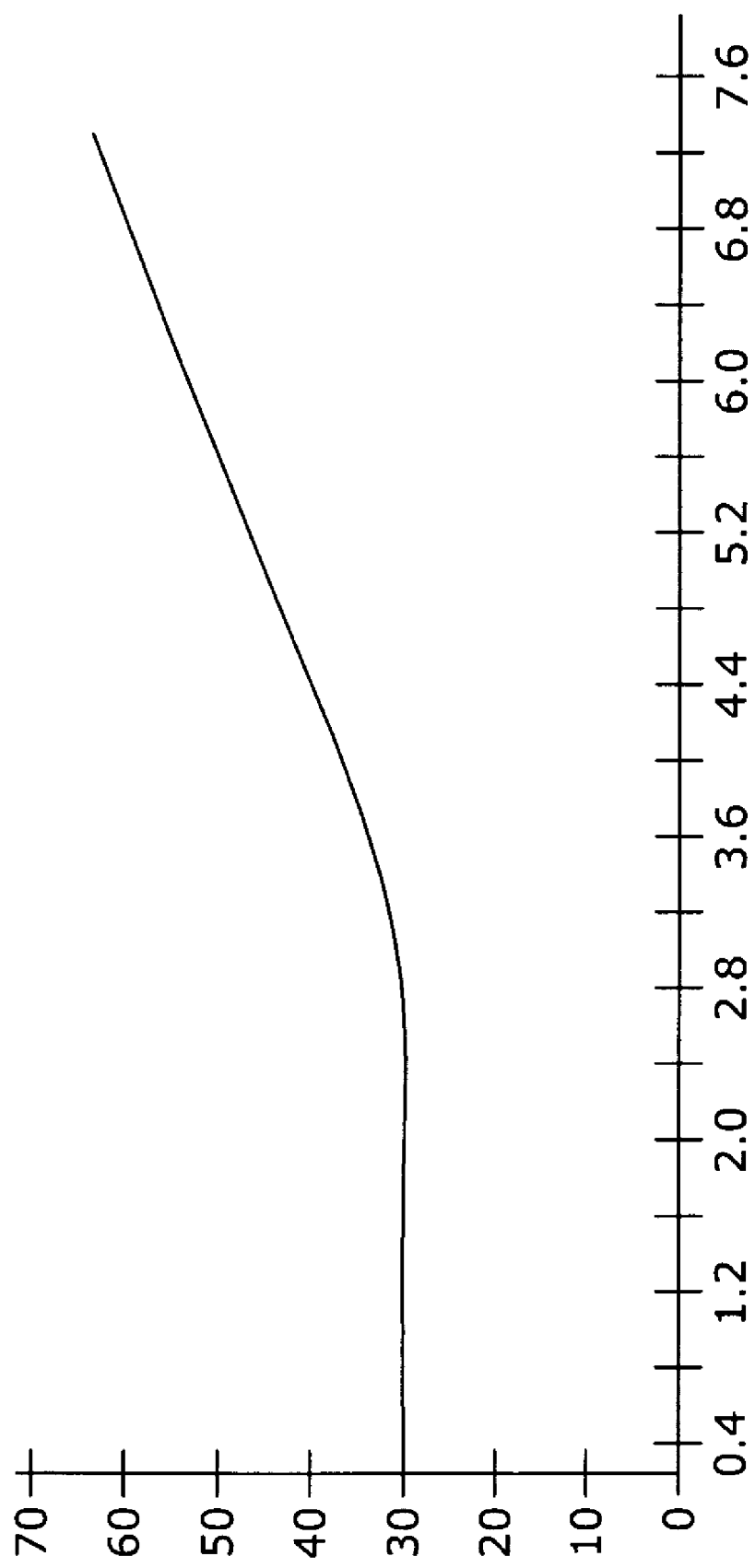
FIG. 21 is an illustrative graph showing the control of an infrared illumination source.

The luminance monitor 230, as described above, may evaluate the current luminance level in the scene and dynamically adjust the power output on the power supply 266. A simple mapping between the output voltage and the corresponding luminance, as shown in FIG. 21, may allow the system to accurately achieve the desired light level in the scene.

Upon receiving the dual input images, generally, the skin detector module 226 may perform a series of operations to isolate the skin in the image data (block 274 and block 276). For example, the output of the skin detection module 226 may be a binary image where all skin appears black against a white background. This image may then be passed to the final unit of the face detection software 220, the face detector module 228.

Generally, the face detector module 228 may locate one or both eyes of the face such that, for example, orientation of the face may be determined. For example, a template process may be used on a composite feature image extracted from the dual reflective-infrared images and the skin image to provide a good approximation of the location of the eyes. Based on the location of the eyes and/or skin, the orientation and extent of the face may be determined heuristically. Such determination may be performed employing certain known orientation characteristics.

For example, a normal line may be defined extending in the y-axis direction (see FIG. 18) orthogonal to the z-axis which splits the eyes of the face being detected. If the person is facing directly forward, generally the normal line may be equidistant between the eyes detected. However, if the person is turned, e.g., head rotated slightly around the y-axis, then one eye will be closer to the normal line than the other.

Similarly, for example, a normal line may be defined extending in the x-axis direction (see FIG. 18) orthogonal to the y-axis which splits the face into an upper and lower region along the level eyes on the face. The eyes may generally be located at a certain position on the face, e.g., with ⅓ of the face above the eyes and ⅔ of the face below the eyes, or in other words below the normal line. If the person is facing directly forward, generally (at least in the example line provided above) ⅓ of the skin detected may be above the normal line and ⅔ below the normal line. However, if the person's head is leaning forward or backward, e.g., head rotated slightly around the x-axis, then a different ratio of skin above the normal line and skin below the normal line may be apparent. For example, such analysis may be used to eliminate portions of detected skin associated with the neck.

Computer apparatus 216 may include a processor operable to execute software to provide a user with operations noted herein, e.g., face detection. As such, computer apparatus as used herein may include not only circuitry such as processors capable of executing various kinds of software, but may also include specialized hardware.

For example, the computer system 216 may be any fixed or mobile computer system, e.g., a personal computer. The exact configuration of the computer system is not necessarily limiting and most any device capable of providing suitable computing capabilities may be used. Further, various peripheral devices, such as a computer display, a mouse, a keyboard, memory, printer, and so forth, may be contemplated for use in combination with a processing apparatus of the system.

With further reference to the receipt of reflective-infrared image data (block 272) for the face detection method 252 of FIG. 17, various examples of providing such reflective-infrared image data and the information that may be obtained using such data may be described herein with reference to FIGS. 3-15. The reflective-infrared spectrum may be particularly beneficial for skin detection purposes.

Human skin may exhibit an abrupt change in reflectance around 1.4 microns. This phenomenology allows for highly accurate skin mapping by taking a weighted difference of a lower band reflective-infrared image and an upper band reflective-infrared image. One advantageous consequence of the phenomenological basis of the skin detection or isolation method may be that artificial human heads or disguised heads do not fool the system.

The skin detector module 226 may use at least a portion of the lower and upper band of the reflective-infrared spectrum to isolate skin versus background in the scene being monitored as reflected generally in block 274 of the face detection method 252 of FIG. 20. As used herein, the portion of the upper band of the reflective-infrared spectrum used may include a portion in the range from 1.4 microns to at least about 1.7 microns. As previously indicated herein, at 2.8 microns thermal energy may begin to appear. As used herein, the portion of the lower band of the reflective-infrared spectrum may include a portion in the range from at least about 0.9 to 1.4 microns.

One illustrative example of the skin isolation process (block 274) of the face detection method 252 shown generally in FIG. 20 may be performed using the concepts described herein. The pixel mapping (i.e., pixel pair or pixel trio with the visible) for the fusion of the two reflective-infrared images (i.e., the upper band and lower band images) is as described herein and may be as follows:

$$P(i,j)_{fused} = P(i,j)_{lower} - f \cdot P(i,j)_{upper}$$

where, $P(i,j)x$ is the pixel value at position $(i,j)$ in the respective image x and f may be the weight factor used (previously listed as constant C). For example, through experimentation it may be determined that a near optimal value for f is 1.38, which may be different for daytime lighting conditions. The weighted subtraction operation may increase substantially the contrast between human skin and the background in the image data.

Following the weighted subtraction process, a thresholding operation may be applied. Any suitable thresholding process that provides for acceptable segmentation of dark and light regions may be used. In general, such thresholding processes compare the data representative of the reflection to one or more thresholding values. Such values may be based on a variety of factors, such as the reflection characteristics of natural skin, of natural hair, background, and so forth. For example, a thresholding process described in the article entitled "A Threshold Selection Method from Gray-Level Histograms" by Otsu, *IEEE Transactions on Systems, Man and Cybernetics*, Vol. SMC-9, No. 1, January 1979, may be used. The thresholding process may generally involve a non-parametric and unsupervised method of threshold selection. An optimal threshold may be selected so as to maximize the separability of the resultant classes in gray levels. The algorithm utilizes only the zeroth-order and the first-order cumulative moments of the gray level histogram. The speed of the system, in part because of the thresholding process, may provide real time images to the user.

An illustrative skin isolation process is shown in the FIGS. 23a-23d. FIG. 23a illustrates a lower reflective-infrared band image wherein the skin has a high reflectivity and FIG. 23b illustrates an upper reflective-infrared band image wherein the skin has a relatively low reflectivity when compared to the high skin reflectivity in the upper lower band. The weighted subtraction image is shown in FIG. 23c and provides a sharper contrast between skin and background. Further, following application of a thresholding algorithm, the binary image of FIG. 23d may be attained.

After the thresholded image is attained, which is representative of a facial search area which can be searched, for eyes of the person, further definition may be provided with respect to the binary image to reduce the search area. This may result in saved processing time later when other algorithms are applied to pixels in the facial search area.

Figure 22:
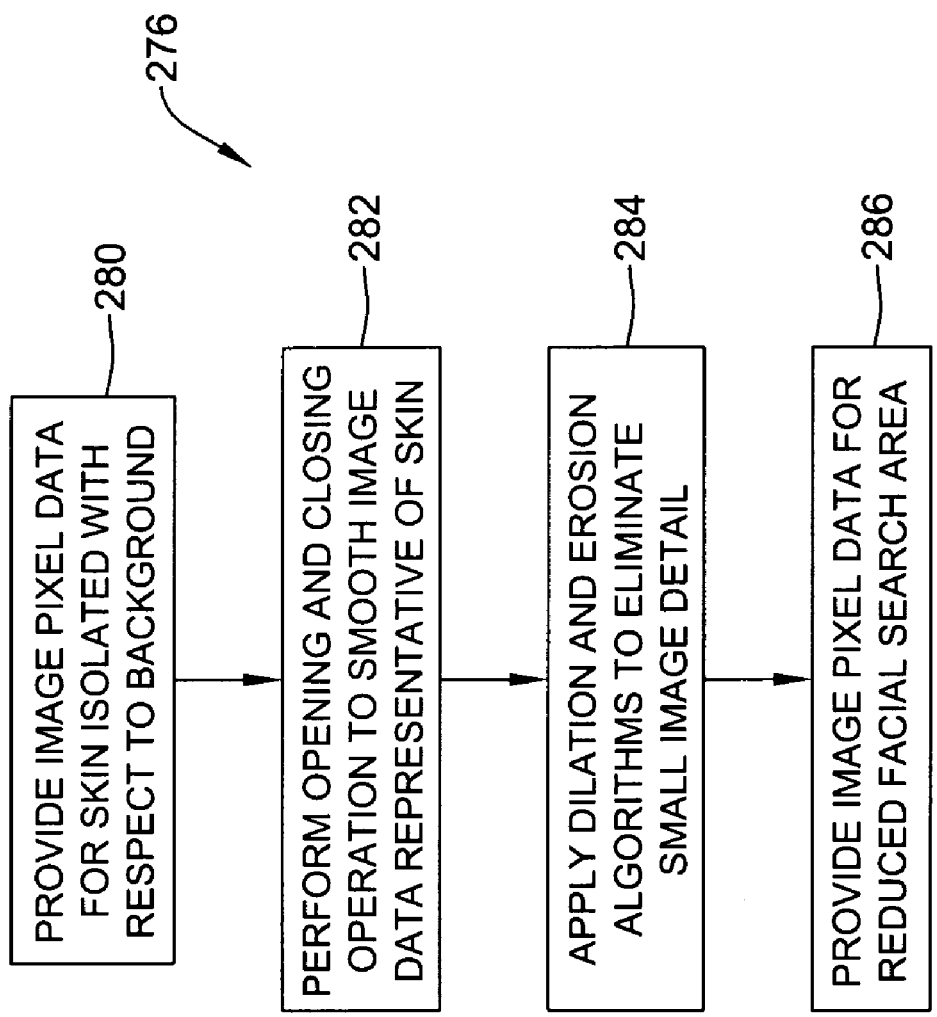
FIG. 22 is an illustrative example of a system for further defining the facial search area as shown generally in FIG. 20.

For example, as shown in FIGS. 23e-23h and described with reference to FIG. 22, such further definition processing may include providing the image pixel data for skin isolated with respect to background, e.g., the binary image (block 280) as shown in FIG. 23d. Thereafter, opening and closing operations may be performed on the image data to smooth the representation of the skin or outline thereof (block 282). In other words, the binary image may undergo a series of morphological operations.

For example, the opening operation may smooth the contour of the skin region, breaks narrow isthmuses, and eliminate small islands and sharp peaks or capes. An open image is shown in FIG. 22e. The closing operation may fuse narrow breaks and long, thin gulfs; eliminates small holes; and fills gaps on the contours. A closed image is shown in FIG. 23f. Such opening and closing techniques may be achieved with techniques of image processing.

Further, the application of dilation and erosion algorithms may be used to result in the elimination of small image detail (block 284). A dilated image is shown in FIG. 23g and an eroded image is shown in FIG. 23h.

Although several various image processing techniques have been described, there may be other techniques that may be used to further define the facial search area. This defined search area may provide data for determining the extent of the detected face.

With the facial search area defined as the isolation of skin in the scene, the eye location process 278 of the face detector method 252 may be applied to pixels that fall in the defined area. However, it should be recognized that the eye location process may be applied to a much larger area without having defined a facial search area to locate eyes of a person. However, the skin may be isolated relative to background to provide a smaller region upon which to apply the eye location process 278.

A goal of the face detection method 252, and particularly the eye locator process 278, may be to determine the orientation and extent of the face 213 of a detected person. This goal may be attained by finding the location of one or both eyes of the face, in the defined facial search area, as may be described with reference to FIGS. 24-29.

The face detection method 252 may accurately determine the location of at least one eye in order to provide information of some use to a face recognition system. A major strength may be the exploitation of the phenomenology exhibited by the skin, eyes, and hair in the reflective-infrared band of the EM spectrum.

Figure 24:
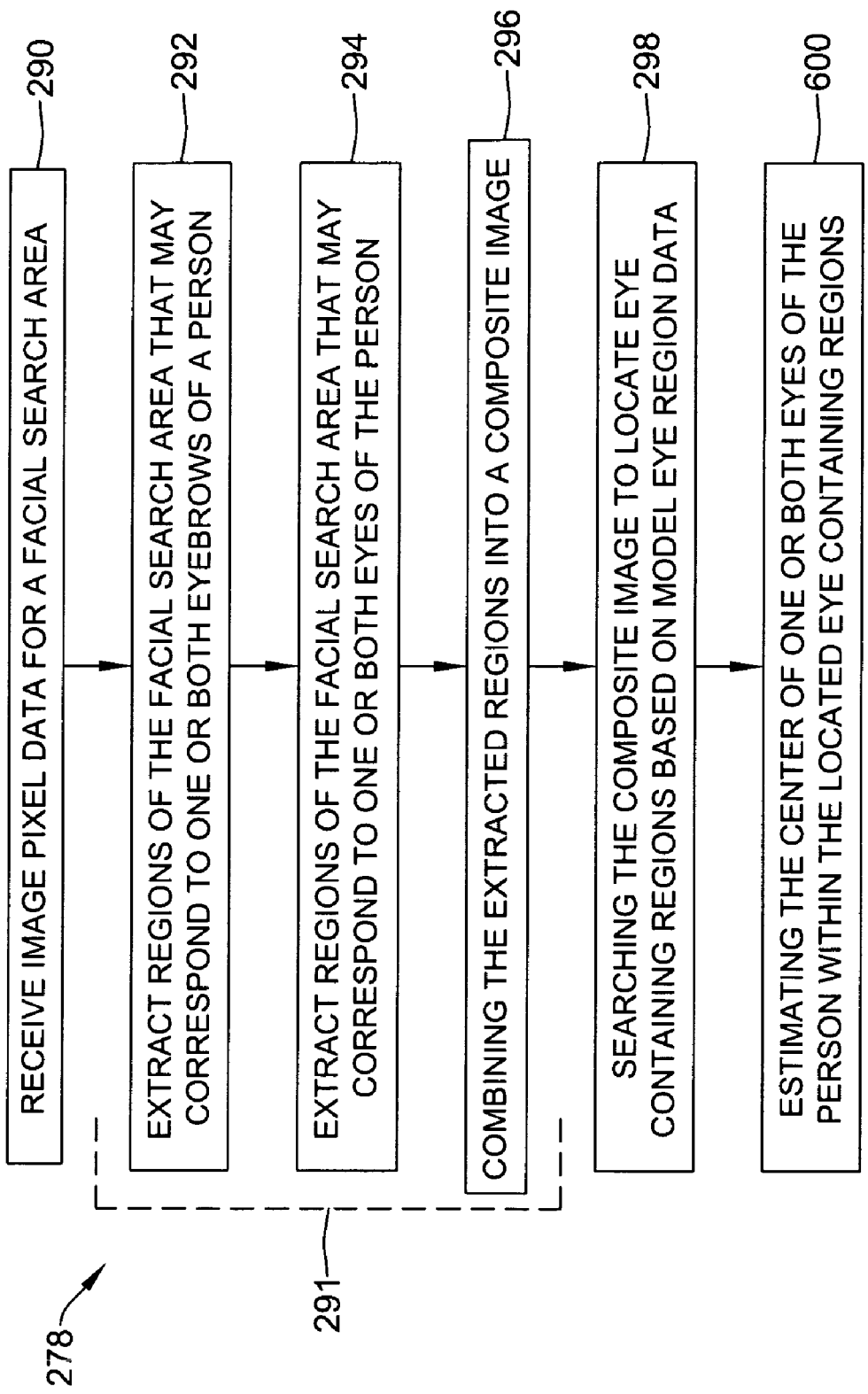
FIG. 24 is an illustrative example of an eye location system shown generally in FIG. 20.

The face detection method 252, and particularly the eye locator process 278, may use a three-step approach to determine the location of one or both eyes as shown in FIG. 24. Upon receipt of image data for the defined facial search area (block 290), e.g., the high and low band reflective-infrared images as shown in FIG. 23a and 23b, respectively, and the output image from the skin detector module as exemplified in FIG. 23h, an extract process 291 may be performed. The extraction process 291 may extract regions in the upper and lower reflective-infrared images that are likely to be the eyebrows (see, for example, FIG. 27a) and eyes (see, for example, FIG. 27b). The extracted regions likely to be the eyebrow and eye features may then be fused into a composite feature image (see, for example, FIG. 27c).

Thereafter, the composite feature image may be searched based on model data representative of an eye region, e.g., standardized data generally representative of a plurality of persons facial characteristics (block 298), to located eye containing regions. The center of one or both eyes of the face may then be estimated within the located eye containing regions (block 600).

There may be an illustrative face detection method 252, and particularly eye locator process 278. First, the eye locator process 278 may include extracting regions in the upper and lower reflective-infrared images that are likely to be the eyebrows (block 292) and likely to be eyes (block 294), respectively. This extraction may be accomplished by capitalizing upon the unique reflectance characteristics of human hair and skin in the upper and lower reflective-infrared bands.

In the upper reflective-infrared band, eyebrow hair may stand out comparatively to the extremely low reflectivity of human skin. The threshold values found to be suitable for the eyebrow extraction may be as follows:

$$B(P_u(x,y)) = \{0.65 < P_u(x,y) < 80 \; \{255, 65 >= P_u(x,y) \text{ or } P_u(x,y) >= 80$$

where $B(\cdot)$ is the eyebrow threshold function, and $P_u(x, y)$ is the pixel value of the upper reflective-infrared image at position (x, y).

In the lower reflective-infrared band, the eyes may stand out comparatively to the extremely high reflectivity of human skin. The threshold values found to be most suitable for the eye extraction may be as follows:

$$E(P_l(x, y)) = \{150, 30 < P_l(x, y) < 90 \; \{255, 30 >= P_l(x, y) \text{ or } P_l(x, y) >= 90$$

where $E(\cdot)$ is the eye threshold function, and $P_l(x, y)$ is the pixel value of the lower reflective-infrared image at position (x, y).

Figure 27B:
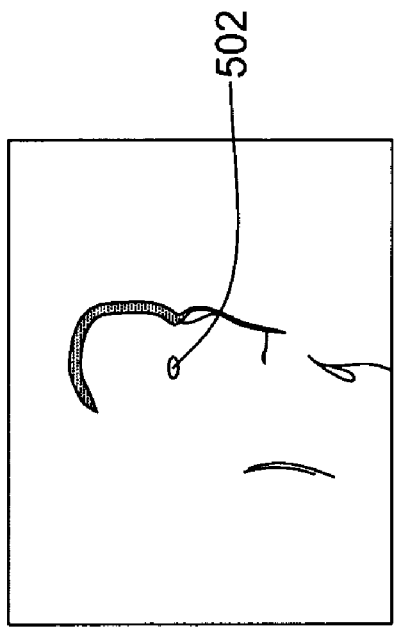
FIGS. 27a-27d are illustrations for use in describing a system for extracting eye and eyebrow features in the eye location system shown generally in FIG. 24.
Figure 27A:
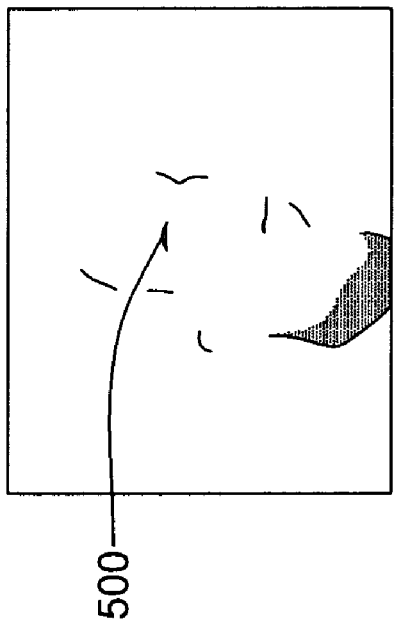

FIG. 27a shows at least one eyebrow region 500 extracted with other regions that meet the threshold. Further, FIG. 27b shows at least one eye 502 extracted with other regions that satisfy the threshold.

The extracted eyebrow and eye feature images may then be fused into a composite feature image (block 296). As shown in FIG. 27c, a tri-level image may be presented wherein the black areas denote likely eyebrow regions, gray areas denote likely eye regions, and the white areas denote all the rest.

As may be seen therein, the actual eyebrow region 500 and eye region 502 are in close proximity to one another. This relationship may be used to apply a template process to search the composite image to locate eye containing regions based on model eye region data (block 298).

Figure 25:
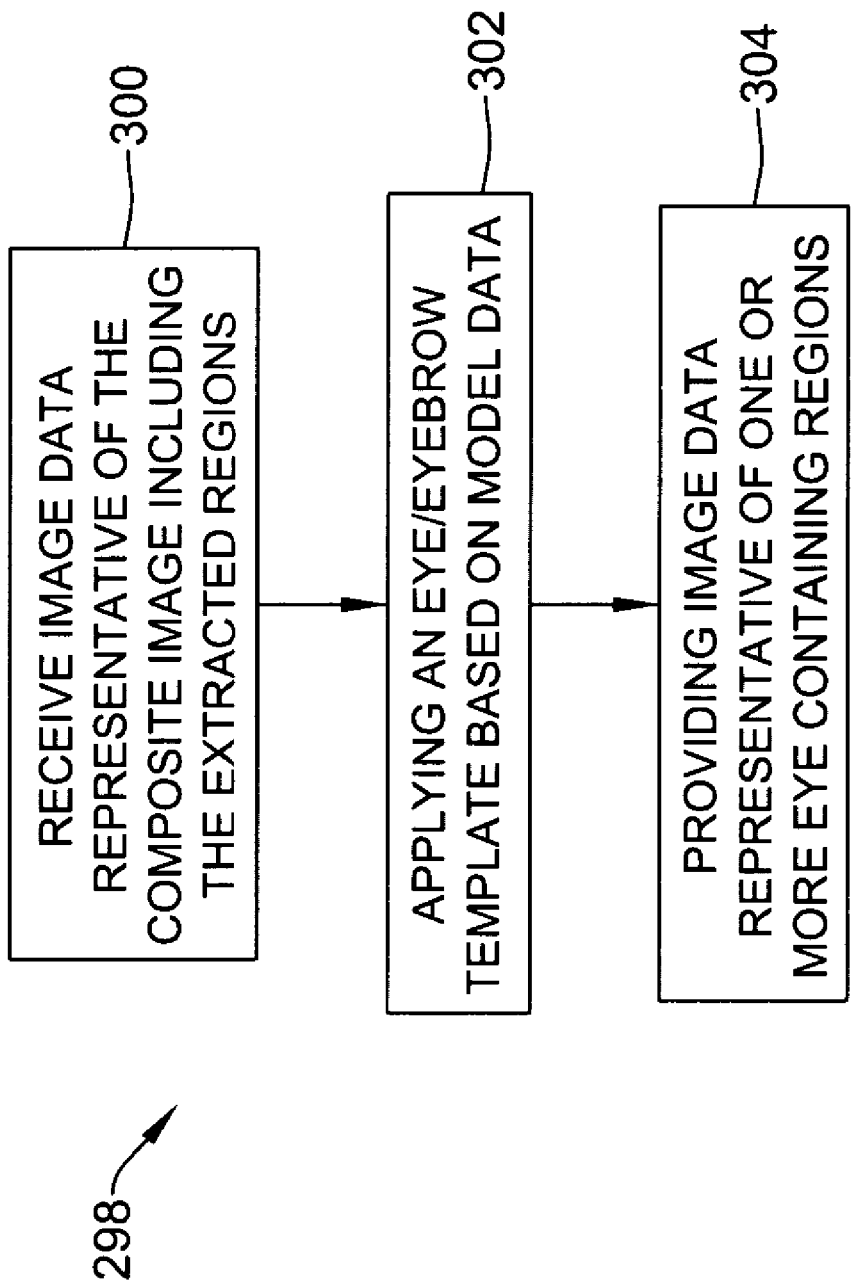
FIG. 25 is an illustrative example of a search method for locating eye containing regions in the eye location method shown generally in FIG. 24.

One illustrative example of the searching method 298 may be described with reference to FIG. 25. As shown in FIG. 25, the searching method 298 may include receiving image data representative of the composite image including the extracted regions (block 300). A template model representative of the position of eyes and eyebrows, e.g., a template normalized over a plurality of persons, may be applied to the composite feature image including the extracted regions (block 302). For example, the template may model the appearance of an eye region in the composite feature image, given the constraints of human anatomy. Thereafter, image data representative of any found or resultant eye containing regions may be provided for further analysis (block 304).

Figure 28:
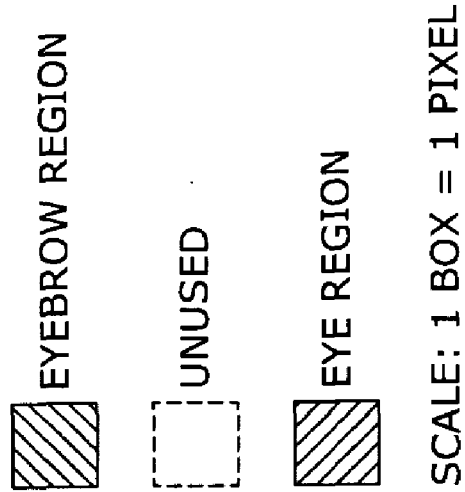
FIG. 28 is an illustration of a template for use in the search method for locating eye containing regions in the eye location system shown generally in FIG. 24, and also further described with reference to FIG. 25.
Figure 28:
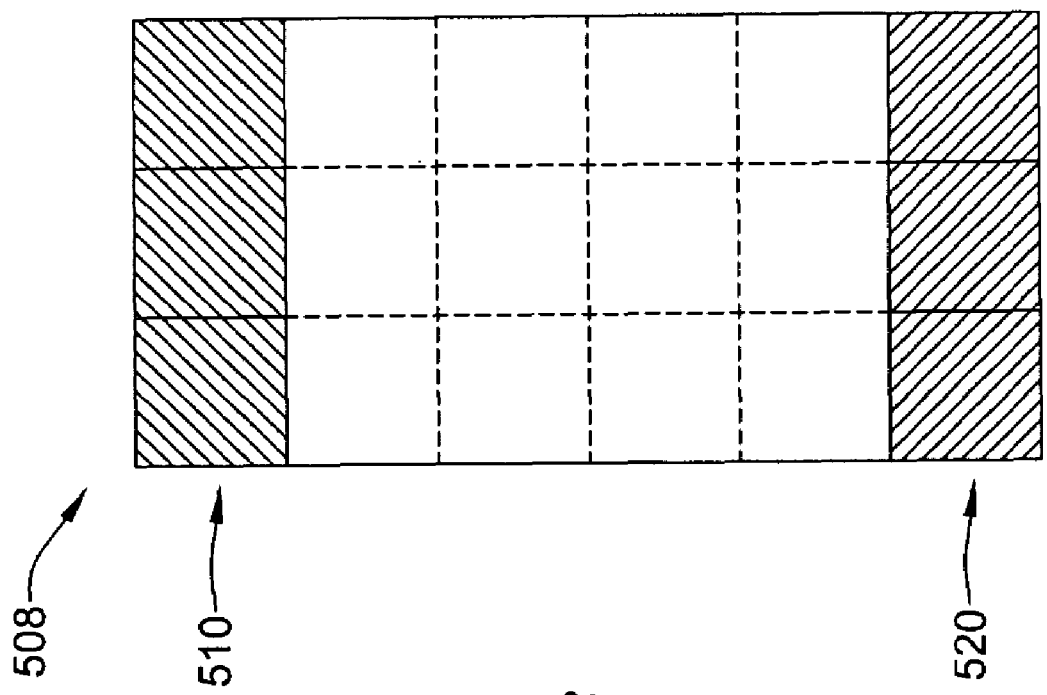

In one illustrative searching method 298, a template process, e.g., a Hough transform, may be used to find the eye containing regions of the composite feature image. For example, a generalized Hough transform template, such as described by D. H. Ballard, "Generalizing the Hough Transform to Detect Arbitrary Shapes," *Pattern Recognition*, Vol. 13, No. 2, pp. 111-122 (1981), may be modeled after the expected appearance of an eye region in the composite feature image. An example template 508 is shown in FIG. 28. The template 508 may include a black region 510 (modeling the eyebrow) over a gray region 520 (modeling the eye). The template 508 may be rotated and sized at each point of implementation to account for the rotation and variation of individual faces. The result of this transformation may be the location of one or more eye containing regions.

Figure 27D:
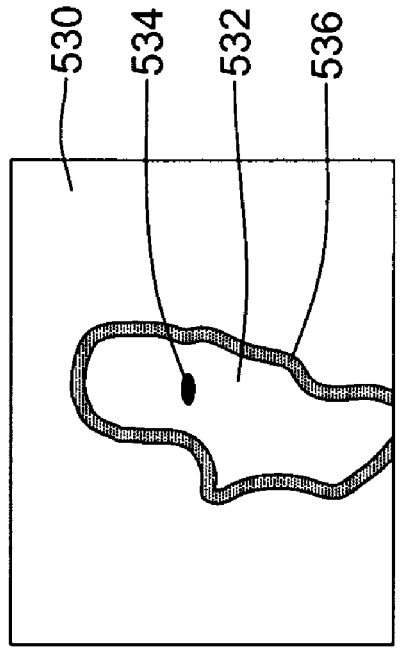
Figure 27C:
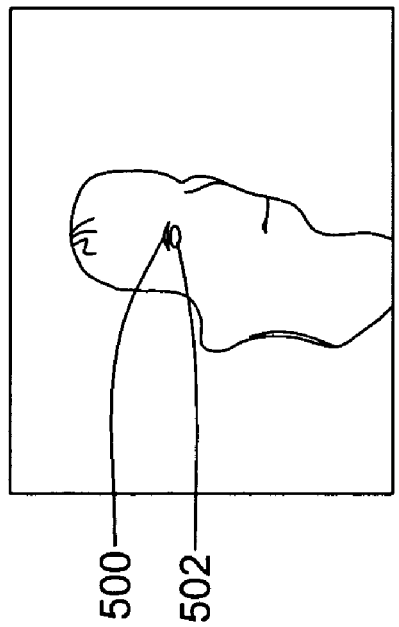

For example, FIG. 27d is an example representation of the result of applying the template 508. The result may be a tri-level image. The background 530 shows as white, the skin region as gray 532, and within the skin region the area(s) that exhibited the strongest response to the eye template are shown as black (e.g., eye containing region 534). In other words, FIG. 27d shows the result of the Hough Transform superimposed on the defined skin image. As can be seen in FIG. 27d, the border 536 is representative of the defined search area that outlines the detected or isolated skin. The extent of the face may be dependant on parameters and/or characteristics of such a border.

Figure 26:
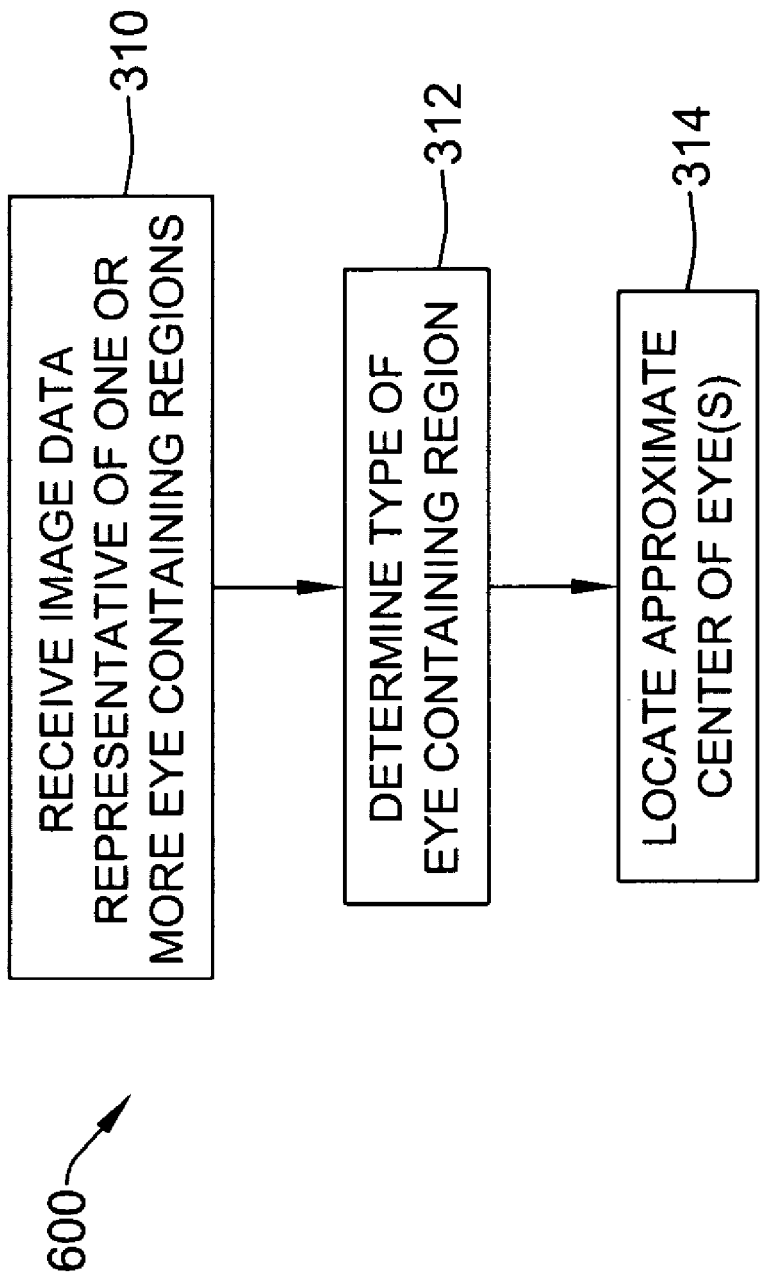
FIG. 26 is one illustrative example of an approximation method for determining the approximate center of one or both eyes of a person in the eye location method shown generally in FIG. 24.
Figure 29A:
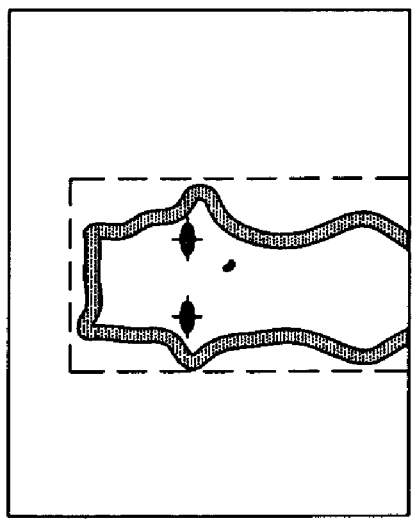
FIGS. 29a-29c are illustrations for use in describing a system for determining the approximate center of one or both eyes of a person in the eye location system shown generally in FIG. 24, and also further described with reference to FIG. 26.
Figure 29B:
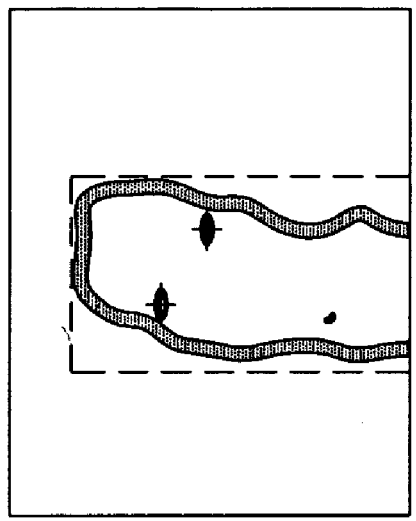
Figure 29C:
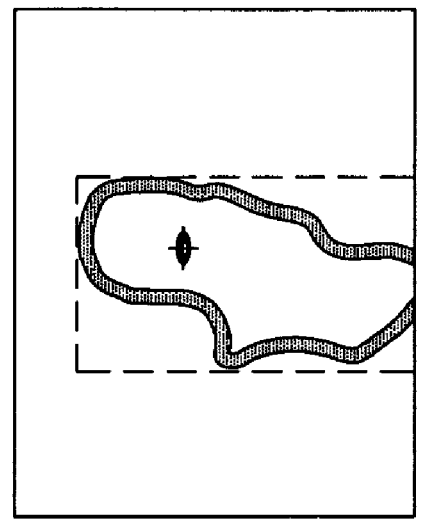

One illustrative example of the eye center estimation process 600 of the eye locator method 278 is shown in FIGS. 29a-29c, and may be described with reference to FIG. 26. The estimation process 600 may receive the data representative of the eye containing regions (block 310) in association with the defined isolated skin region (see, for example, FIG. 27d). The process 600 may determine what type(s) of eye containing region(s) have been located (block 312). After the type(s) of eye containing region(s) have been identified, then the approximate center of one or both eyes may be estimated (block 314).

For example, the center of the subject's eyes may be estimated through blob analysis. A blob may refer to a group of connected pixels. Because of the variation in human faces, many different patterns of "eye" blobs, which correspond to eye containing regions, may arise in the resulting Hough Transform image in three cases as shown in FIGS. 29a-29c.

In the case of FIG. 29a, there is a single blob that spans the width of the face region. This blob may be bisected in the middle and processed as two smaller blobs to determine the center of both eyes contained therein. In the case of FIG. 29b, there are two blobs that are roughly equal size and which are generally of a larger size than any other blobs. The centers of both eyes represented thereby may be determined. In the case of FIG. 29c, there may be a single small blob set apart from and of a larger size than any other blobs. Here, only a single eye center is determined.

Ultimately, the face detector may locate the center of one or both of the eyes. For example, the center may be taken as the centroids of the selected blobs. However, as the blobs represent not only eyes, but also eyebrows, the center of the eyes will not be the centroid but may generally be found as a function of the centroid of such blobs, e.g., offset from the centroid by a particular distance.

Once the center of the eyes is located, then the orientation of the head may also be determined. For example, if the eyes fall within a certain region of the isolated skin, then it may be determined that the head is at a certain position, e.g., the subject may be looking down or up.

After the orientation and location of the head are known then it may be possible to ascertain if a good image of the face can be extracted for recognition purposes. It may also be a viable option to extrapolate where necessary to create a frontal image of the face from any given rotation, provided of course that at least half of the face is visible.

In the present specification, some of the material may be of a hypothetical or prophetic nature although stated in another manner or tense.

Although the invention has been described with respect to at least one illustrative embodiment, many variations and modifications will become apparent to those skilled in the art upon reading the present specification. It is therefore the intention that the appended claims be interpreted as broadly as possible in view of the prior art to include all such variations and modifications.

What is claimed is:

1. A detection system comprising:
   a first detector array for providing a first image having a field-of-view of a scene in a lower reflective infrared band;
   a second detector array for providing a second image having the field-of-view of the scene in an upper reflective infrared band;
   a third detector array for providing a third image having the field-of-view of the scene in a visible band;
   a subtractive mechanism, connected to the first, second and third detector arrays, for determining the differences of intensities of elements of the first and second images and forming a fourth image of elements having the differences of intensities and having the field-of-view;
   a thresholder, connected to the subtractive mechanism, for nulling the elements of the fourth image having differences of intensities that do not meet a certain threshold intensity value;
   a feature selector, connected to the thresholder, for finding facial features in the fourth image and detecting a face with the features;
   a framer, connected to the feature selector, for placing a frame around the face in the fourth image;

a first integrator, connected to the framer, for inserting the frame that surrounds the face in the first image; and a second integrator, connected to the framer, for inserting the frame that surrounds the face in the third image.

2. The system of claim 1, further comprising:

a first extractor, connected to the first integrator, for extracting a first sub-image from within the frame containing the face in the first image;

a second extractor, connected to the second integrator, for extracting a second sub-image from within the frame containing the face in the third image;

a first recognition system, connected to the first extractor, for comparing the face of the first sub-image with faces from a first database; and a second recognition system, connected to the second extractor, for comparing the face of the second sub-image with faces from a second database.

3. The system of claim 2, wherein:

the first recognition system is for providing an approximate match of the face of the first sub-image with face-related information from the first database; and the second recognition system is for providing an approximate match of the face of the second sub-image with face-related information from the second database.

4. The system of claim 3, further comprising:

a first evaluator, connected to the first extractor, for evaluating the match of the face of the first sub-image with face-related information from the first database; and a second evaluator, connected to the second extractor, for evaluating the match of the face of the second sub-image with face-related information from the second database.

5. The system of claim 4, wherein:

the first evaluator is for providing a first confidence level of recognition of the face of the first sub-image; and the second evaluator is for providing a second confidence level of recognition of the face of the second sub-image.

6. The system of claim 5, further comprising:

a confidence levels combiner, connected to the first and second evaluator, for combining the first confidence level and the second confidence level; and wherein the confidence levels combiner is for outputting a resultant confidence level of recognition of the face of the first and second sub-images.

7. The system of claim 6, further comprising a light source for providing infrared illumination for the first, second and third detector arrays, as needed.

8. The system of claim 7, wherein:

the lower reflective infrared band is approximately between 800 and 1400 nanometers; and the upper reflective infrared band is approximately between 1400 and 2200 nanometers.

9. A human detection system comprising:

a multi-band camera having first, second and third outputs;

a subtractor connected to the first and second outputs;

a thresholder connected to the subtractor;

a feature selector connected to the thresholder;

a framer connected to the thresholder;

a first pixel integrator connected to the framer and the first output;

a second pixel integrator connected to the framer and the third output;

a first extractor connected to the first integrator;

a second extractor connected to the second integrator;

a first recognition system connected to the first extractor; and a second recognition system connected to the second extractor.

10. The system of claim 9, further comprising:

a first evaluator connected to the first recognition system; and a second evaluator connected to the second recognition system.

11. The system of claim 10, wherein:

the first output of the multi-band camera has a bandwidth in the lower reflective region of the infrared spectrum;

the second output of the multi-band camera has a bandwidth in the upper reflective region of the infrared spectrum; and the third output of the multi-band camera has a bandwidth in the visible region of the spectrum.

12. The system of claim 11, wherein the subtractor may remove pixels from an image which are not representative of skin.

13. The system of claim 12, wherein:

the feature selector seeks out features of a face in the image;

the feature selector may retain only the face in the image; and the framer may output a framed image of the face.

14. The system of claim 13, wherein:

the first pixel integrator may match the pixels of the framed image with an image from the first output of the multi-band camera;

the first pixel integrator may superimpose the frame on the image from the first output of the multi-band camera;

the second pixel integrator may match the pixels of the framed image with an image from the third output of the multi-band camera; and the second pixel integrator may superimpose the frame on the image from the third output of the multi-band camera.

15. The system of claim 14, wherein:

the first extractor may extract a portion of the image from the first output within the frame; and the second extractor may extract a portion of the image from the third output within the frame.

16. The system of claim 15, wherein:

the portion of the image from the first output may be sent to the first recognition system;

the first recognition system may perform a match of the portion of the image from the first output with a similar image from a data system;

the portion of the image from the third output may be sent to the second recognition system;

the second recognition system may perform a match of the portion of the image from the third output with a similar image from a data system.

17. The system of claim 16, wherein:

the first evaluator may provide a first confidence level of recognition of the match of the portion of the image from the first output with a similar image from a data system; and the second evaluator may provide a second confidence level of recognition of the match of the portion of the image from the third output with a similar image from a data system.

18. The system of claim 17, further comprising a confidence level integrator for providing a resultant confidence level based on the first and second confidence levels of recognition.

19. The system of claim 18, further comprising a light source for providing infrared lighting as needed.

20. A detection system comprising:
a first array of detector pixels having a field of view of a scene;
a second array of detector pixels having the field of view;
a third array of detector pixels having the field of view;
a subtractor connected to the first and second arrays;
a comparator connected to the subtractor; and
wherein:
the first array of detector pixels has a sensitivity to light in a lower portion of a reflective infrared spectrum;
the second array of detector pixels has a sensitivity to light in an upper portion of a reflective infrared spectrum;
the third array of detector pixels has a sensitivity to light in a visible spectrum;
a pixel trio includes a first pixel at a location of the first array of detector pixels which has a one-to-one correlation with a second pixel of the pixel trio at a corresponding location of the second array of detector pixels, and which has a one-to-one correlation with a third pixel of the pixel trio at a corresponding location of the third array of detector pixels;
the subtractor is for detecting differences of magnitudes of output signals from the first and second pixels of each pixel trio and outputting a magnitude difference signal of the first and second pixels for each pixel trio; and
the comparator is for comparing the magnitude difference signals to a certain threshold value and selecting the pixel trios with the first and second pixels having magnitude difference values on one side of the threshold value.

21. The system of claim 20, wherein:
the pixel trios with the first and second pixels having a magnitude difference value on one side of the threshold value reveal low infrared light reflectance areas in the scene; and
the low reflectance areas may form an image having the field of view and a pixel layout like that of the first, second and third arrays of detector pixels.

22. The system of claim 21, further comprising:
a face feature selector; and
wherein the feature selector may locate features of a face in the image and detect the face.

23. The system of claim 22, further comprising:
a framer; and
wherein the framer may place a frame around the face in the image;
pixels within the frame may be matched with pixels at corresponding locations in an image from the first array of detector pixels and an image from the third array of pixels.

24. The system of claim 23, further comprising:
an extractor; and
wherein the extractor may extract a first sub-image containing the face within the frame in the image from the first array of detector pixels and a second sub-image containing the face within the frame in the image from the third array of detector pixels.

25. The system of claim 24, further comprising:
a first face recognition system; and
a second face recognition system; and
wherein:
the first face recognition system may match the first sub-image of the face with another sub-image of an identified face; and
the second face recognition system may match the second sub-image of the face with another sub-image of an identified face.

26. The system of claim 25, further comprising:
an evaluator; and
wherein:
the evaluator may indicate a first confidence level of recognition of the face in the first sub-image; and
the evaluator may indicate a second confidence level of recognition of the face in the second sub-image.

27. The system of claim 26, further comprising:
a resultant confidence indicator; and
wherein the resultant confidence indicator may provide a combined confidence level of recognition of the face in the first and second sub-images.

28. The system of claim 27, further comprising a database of sub-images of identified faces, connected to the first and second face recognition systems.

29. The system of claim 28, further comprising a light source for providing infrared light on the scene.

30. The system of claim 29, further comprising a processor for regulating the source for providing light on the scene as needed.

31. A method for detecting a face in a scene, comprising:
capturing a first image the scene with a first detector array sensitive to a first band of reflective infrared light;
capturing a second image of the scene with a second detector array sensitive to a second band of reflective infrared light; and
capturing a third image of the scene with a third detector array sensitive to a band of visible light; and
wherein:
the first image comprises m×n pixels;
the second image comprises m×n pixels;
the third image comprises m×n pixels;
the first, second and third images have the same field of view of the scene;
each pixel $P_{(i,j)1}$ of the first image is located at an ith row and a jth column;
each pixel $P_{(i,j)2}$ of the second image is located at an ith row and a jth column;
each pixel $P_{(i,j)3}$ of the third image is located at an ith row and a jth column;
$1 \leq i \leq m$;
$1 \leq j \leq n$;
each pixel $P_{(i,j)1}$ of the first image has a counterpart pixel $P_{(i,j)2}$ in the second image in a one-to-one mapping of the first image to the second image;
each pixel $P_{(i,j)2}$ of the second image has a counterpart pixel $P_{(i,j)3}$ in the third image in a one-to-one mapping of the second image to the third image;
a difference intensity pixel $\Delta I_{P(i,j)}$ may be determined from an intensity of each pixel $I_{P(i,j)1}$ of the first image and each counterpart pixel $I_{P(i,j)}$ of the second image, for all of the pixels of the first and second images;
each difference intensity pixel $\Delta I_{P(i,j)}$ has an intensity value that may be measured against an intensity threshold value and has its value nullified if it does not meet a certain range of intensity values relative to the intensity threshold value, and becomes a thresholded difference intensity pixel $T\Delta I_{P(i,j)}$;
each thresholded difference intensity pixel together with each other thresholded difference intensity pixel forms a fourth image having a one-to-one mapping of pixels to the first and second images; and
features of a face are sought, and if found, a face is detected in the fourth image and a frame is scribed as frame pixels in the fourth image around the face.

32. The method of claim 31, further comprising:
copying the frame pixels from the fourth image to the first image and the third image on a one-to-one mapping basis;
extracting the pixels within the frame in the first image to form a fifth image having the face extracted from the first image; and
extracting the pixels within the frame in the third image to form a sixth image having the face extracted from the third image.

33. The method of claim 32, further comprising:
comparing the face in the fifth image with faces from a first database;
comparing the face in the sixth image with faces from a second database;
matching the face in the fifth image with a face from the first database; and
matching the face in the sixth image with a face from the second database.

34. The method of claim 33, further comprising:
evaluating the matching of the face in the fifth image with the face from the first database;
determining a first confidence level of recognition of the face in the fifth image relative to the face from the first database;
evaluating the matching of the face in the sixth image with the face from the second database; and
determining a second confidence level of recognition of the face in the sixth image relative to the face from the second database.

35. The method of claim 34, further comprising determining an overall confidence of recognition of the face in the scene from the first and second confidence levels of recognition.

36. The method of claim 35, further comprising shining infrared light on the scene as needed for obtaining adequate first and second images of the scene.

37. The method of claim 36, wherein:
the first band of reflective infrared light is approximately between 800 and 1400 nanometers; and
the second band of reflective infrared light is approximately between 1400 and 2200 nanometers.

38. The method of claim 37, wherein the first and second databases are the same database.

39. An apparatus for detecting faces, comprising:
means for obtaining a first image with a first field of view of a scene at a lower reflective infrared band of light;
means for obtaining a second image with the first field of view of the scene at an upper reflective infrared band of light;
means for obtaining a third image with the first field of view of the scene at a visible band of light;
means for subtractively combining the first and second images into a fourth image;
means for thresholding the pixels of the fourth image to result in a fifth image having only the pixels meeting a set threshold value;
means for finding features of a face in the fifth image;
means for inserting a frame around the face based on the features;
means for transferring the frame to be around the face in the first image; and
means for transferring the frame to be around the face in the third image.

40. The means of claim 39, further comprising:
means for extracting a first sub-image of the face within the frame in the first image;
means for extracting a second sub-image of the face within the frame in the third image;
means for possibly at least approximately matching the face in the first sub-image with at least one other face in a first database; and
means for possibly at least approximately matching the face in the second sub-image with at least one other face in a second database.

41. The means of claim 40, further comprising:
means for evaluating the matching the face in the first sub-image with the at least one other face in the first database;
means for evaluating the matching the face in the second sub-image with the at least one other face in the second database;
means for determining a first confidence level of recognition of the face in the first sub-image; and
means for determining a second confidence level of recognition of the face in the second sub-image.

42. The means of claim 41, further comprising means for determining an overall confidence level of recognition from the first and second levels of recognition.

43. The means of claim 42, further comprising means for providing infrared lighting on the scene as needed for obtaining the first and second images.

44. The means of claim 43, wherein:
the lower reflective infrared band of light is approximately between 800 and 1400 nanometers; and
the upper reflective infrared band of light approximately between 1400 and 2200 nanometers.

45. The means of claim 44, wherein the first and second databases are the same database.

\* \* \* \* \*

UNITED STATES PATENT AND TRADEMARK OFFICE
CERTIFICATE OF CORRECTION

| | |
|---|---|
| PATENT NO. | : 7,602,942 B2 |
| APPLICATION NO. | : 10/987806 |
| DATED | : October 13, 2009 |
| INVENTOR(S) | : Bazakos et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1370 days.

Signed and Sealed this

Fifth Day of October, 2010

David J. Kappos
*Director of the United States Patent and Trademark Office*